(12) United States Patent
Wilson et al.

(10) Patent No.: US 10,949,071 B2
(45) Date of Patent: Mar. 16, 2021

(54) INTERACTIVE USER INTERFACES FOR LOCATION-BASED DATA ANALYSIS

(71) Applicant: Palantir Technologies Inc., Palo Alto, CA (US)

(72) Inventors: Matthew Julius Wilson, London (GB); Tom Alexander, Abu Dhabi (AE); Daniel Cervelli, Mountain View, CA (US); Trevor Fountain, Edinburgh (GB); Quentin Spencer-Harper, London (GB); Daniel Horbatt, London (GB); Guillem Palou Visa, London (GB); Dylan Scott, Palo Alto, CA (US); Trevor Sontag, Palo Alto, CA (US); Kevin Verdieck, Palo Alto, CA (US); Alexander Ryan, Palo Alto, CA (US); Brian Lee, Sunnyvale, CA (US); Charles Shepherd, London (GB); Emily Nguyen, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 23 days.

(21) Appl. No.: 16/567,540

(22) Filed: Sep. 11, 2019

(65) Prior Publication Data
US 2020/0042163 A1 Feb. 6, 2020

Related U.S. Application Data

(63) Continuation of application No. 15/852,613, filed on Dec. 22, 2017, now Pat. No. 10,459,619, which is a
(Continued)

(51) Int. Cl.
*G06F 3/048* (2013.01)
*G06F 3/0484* (2013.01)
(Continued)

(52) U.S. Cl.
CPC ...... *G06F 3/04847* (2013.01); *G06F 3/04817* (2013.01); *G06F 3/04842* (2013.01); *G06F 16/29* (2019.01); *G06T 11/206* (2013.01)

(58) Field of Classification Search
CPC ...... G01V 99/005; G01V 1/306; B65D 88/02; E21B 49/00; G06N 3/04; G06T 11/206;
(Continued)

(56) References Cited

U.S. PATENT DOCUMENTS 5,444,619 A * 8/1995 Hoskins ............... E21B 49/00
382/159
9,696,442 B2 * 7/2017 Li .......................... G01V 1/306
(Continued)

OTHER PUBLICATIONS

U.S. Appl. No. 14/741,256, filed Jun. 16, 2015, Sensor Data Analysis System.
(Continued)

*Primary Examiner* — Rashawn N Tillery
(74) *Attorney, Agent, or Firm* — Knobbe Martens Olson & Bear LLP

(57) ABSTRACT

Various systems and methods are provided that display various geographic maps and depth graphs in an interactive user interface in substantially real-time in response to input from a user in order to determine information related to measured data points, depth levels, and geological layers and provide the determined information to the user in the interactive user interface. For example, a computing device may be configured to retrieve data from one or more databases and generate one or more interactive user interfaces. The one or more interactive user interfaces may display the retrieved data in a geographic map, a heat map, a cross-plot graph, or one or more depth graphs. The user interface may be interactive in that a user may manipulate any of the graphs to identify trends or current or future issues.

10 Claims, 36 Drawing Sheets

Related U.S. Application Data continuation of application No. 15/072,133, filed on Mar. 16, 2016, now Pat. No. 9,891,808.

(60) Provisional application No. 62/200,565, filed on Aug. 3, 2015, provisional application No. 62/133,857, filed on Mar. 16, 2015.

(51) Int. Cl.
  *G06F 16/29* (2019.01)
  *G06F 3/0481* (2013.01)
  *G06T 11/20* (2006.01)

(58) Field of Classification Search
  CPC .. G06F 3/04842; G06F 3/04817; G06F 16/29; G06F 3/04847
  See application file for complete search history.

(56) References Cited

U.S. PATENT DOCUMENTS

| | | | | |
|---|---|---|---|---|
| 9,852,373 | B2* | 12/2017 | De Stefano | G06N 3/04 |
| 9,891,808 | B2 | 2/2018 | Wilson et al. | |
| 10,444,940 | B2 | 10/2019 | Cervelli et al. | |
| 10,444,941 | B2 | 10/2019 | Cervelli et al. | |
| 10,459,619 | B2 | 10/2019 | Wilson et al. | |
| 2014/0048542 | A1* | 2/2014 | Wakita | B65D 88/02 220/565 |
| 2014/0222403 | A1* | 8/2014 | Lepage | G01V 99/005 703/6 |
| 2014/0278106 | A1* | 9/2014 | Mallet | G01V 99/005 702/2 |
| 2015/0310645 | A1* | 10/2015 | Baumecker | G06T 11/206 345/440 |
| 2016/0124116 | A1* | 5/2016 | Souche | G01V 99/005 703/2 |

OTHER PUBLICATIONS

Official Communication for European Patent Application No. 16160781.7 dated Jan. 3, 2019.

Official Communication for European Patent Application No. 19186114.5 dated Jan. 16, 2020.

LeSage, "Lecture 2: Mapping in Matlab," Mar. 2004, retrieved from the Internet: URL: http://www4.fe.uc.pt/spatial/doc/lecture2.pdf, 40 pages.

Lovelace et al., "Introduction to visualizing spatial data in R," Jun. 25, 2014, retrieved from the Internet: URL: https://cran.microsoft.com/snapshot/2014-09-30/doc/contrib/intro-spatial-rl.pdf, 24 pages.

Bivand et al., "Bindings for the Geospatial Data Abstraction Library—Package 'rgdal'," Mar. 15, 2015, retrieved from the Internet: URL: https://mran.microsoft.com/snapshot/2015-03-29/web/packages/rgdal/rgdal.pdf, 49 pages.

* cited by examiner

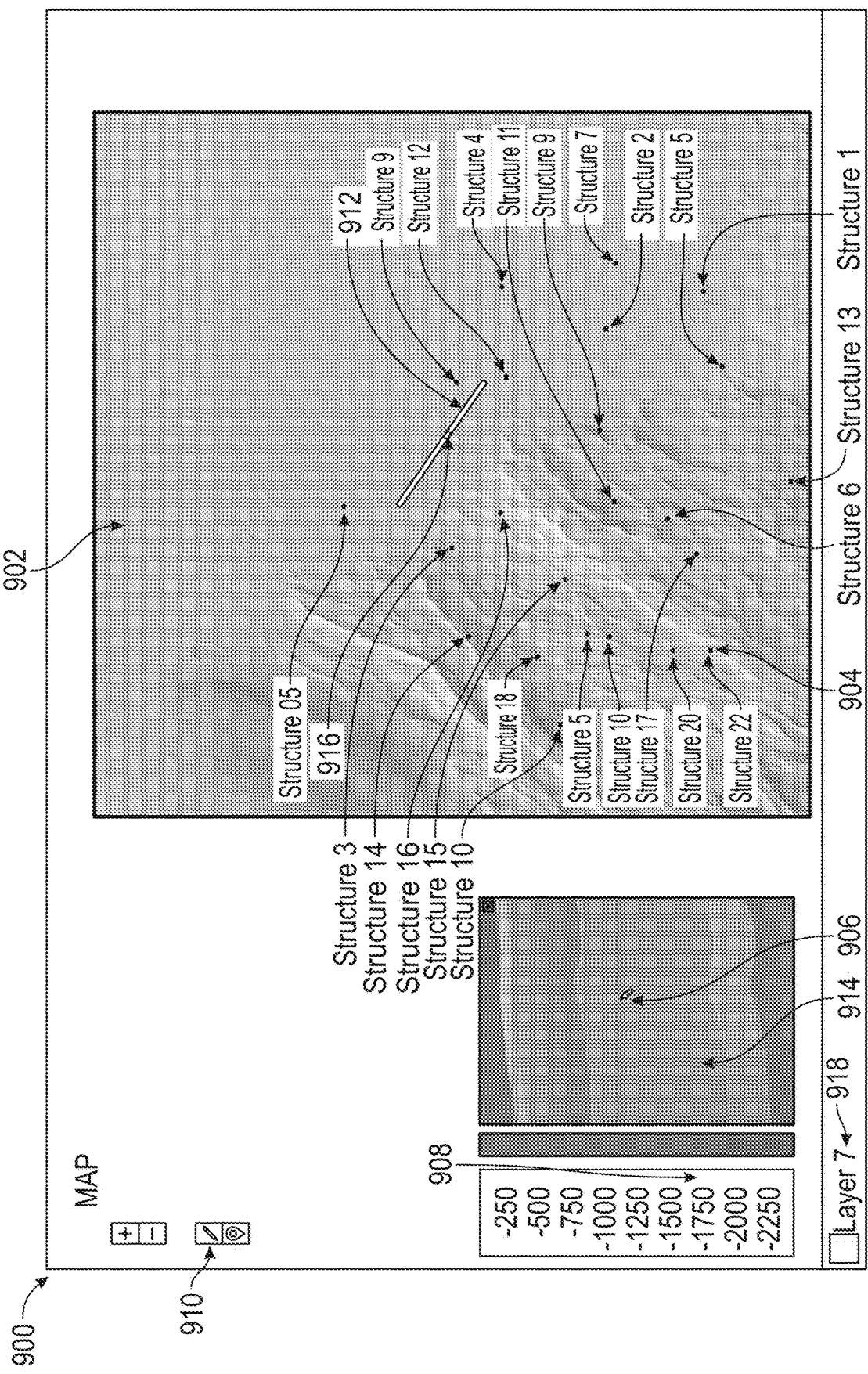

US 10,949,071 B2

INTERACTIVE USER INTERFACES FOR LOCATION-BASED DATA ANALYSIS

CROSS-REFERENCE TO RELATED APPLICATIONS

This application is a continuation of U.S. patent application Ser. No. 15/852,613, entitled "Interactive User Interfaces for Location-Based Data Analysis," filed Dec. 22, 2017, which application is a continuation of U.S. patent application Ser. No. 15/072,133, entitled "Interactive User Interfaces for Location-Based Data Analysis," filed Mar. 16, 2016, which application claims benefit of U.S. Provisional Patent Application Ser. No. 62/133,857 entitled "Sensor Data Analysis System" filed Mar. 16, 2015, and U.S. Provisional Patent Application Ser. No. 62/200,565 entitled "Displaying Attribute and Event Data Along Paths" filed Aug. 3, 2015, each of which is hereby incorporated by reference in its entirety and for all purposes.

Any and all applications for which a foreign or domestic priority claim is identified in the Application Data Sheet as filed with the present application are hereby incorporated by reference under 37 CFR 1.57.

TECHNICAL FIELD

The present disclosure relates to systems and techniques for querying databases and displaying queried data in an interactive user interface.

BACKGROUND

A database may store a large quantity of data. For example, a system may comprise a large number of sensors that each collect measurements at regular intervals, and the measurements may be stored in the database. The measurement data can be supplemented with other data, such as information regarding the locations where measured data was captured, and the supplemental data can also be stored in the database.

In some cases, a user may attempt to analyze a portion of the stored data. For example, the user may attempt to analyze a portion of the stored data that is associated with a specific location. However, as the number of measurements increases over time, it can become very difficult for the user to identify the relevant data and perform the analysis.

SUMMARY

The systems, methods, and devices described herein each have several aspects, no single one of which is solely responsible for its desirable attributes. Without limiting the scope of this disclosure, several non-limiting features will now be discussed briefly.

Disclosed herein are various systems and methods for accessing data stored in one or more databases in substantially real-time in response to input from a user in order to determine associations between the data and physical locations and to provide the determined associations to the user in an interactive user interface. For example, the computing device may be configured to project a three-dimensional path onto a two-dimensional plane to generate a two-dimensional path, wherein the three-dimensional path corresponds to a trajectory in physical space and comprises a plurality of locations. In response to a received request specifying one or more attributes or event types associated with the three-dimensional path, wherein an event type is associated with one or more events, the computing system may access a database to retrieve data corresponding to the requested one or more attributes or event types, determine associations between the retrieved data and respective locations on the two-dimensional path, and generate user interface data for rendering an interactive user interface, wherein the user interface data includes the two-dimensional path and indications of at least a portion of the retrieved data at corresponding locations on the two-dimensional path, based upon the associations between the retrieved data and respective locations on the two-dimensional path.

In some embodiments, the three-dimensional path may comprise a three-dimensional model of the trajectory.

In some embodiments, the indications of at least a portion of the retrieved data at corresponding location on the two-dimensional path comprises one or more bars associated with the selected attributes or event types at the corresponding locations on the two-dimensional path, wherein a length of a bar of the one or more bars at a particular location is based at least in part upon a value associated with the attribute or event type associated with the bar at the particular location. For example, the request may specify at least a first attribute or event type and a second attribute or event type, wherein one or more bars associated with the first attribute or event type are overlaid on top of one or more bars associated with the second attribute or event type. In some embodiments, a bar of the one or more bars may correspond to at least two events associated with a path location of the bar, wherein a length of the bar is based at least in part upon an aggregate value associated with the at least two events. In some embodiments, in response to a selection of a bar of the one or more bars, the interactive user interface may display data corresponding to an attribute or event associated with the selected bar. In some embodiments, a bar of the one or more bars is displayed to be substantially perpendicular to a tangent of the path at a location on the two-dimensional path corresponding to the bar.

In some embodiments, determining associations between the retrieved data and respective locations on the two-dimensional path may comprise determining associations between the retrieved data and respective locations on the three-dimensional path, and determining associations between the locations on the three-dimensional path and respective locations on the two-dimensional path.

Another aspect of the disclosure provides a computing system configured to generate user interface data for rendering the interactive user interface on a computing device, the interface user interface including a map corresponding to a physical region. The computing system may further be configured to receive a selection specifying at least one attribute, access the database to identify attribute values associated with the selected at least one attribute, determine one or more associations between the identified attribute values and locations on the map, generate a heatmap corresponding to the map, based at least in part upon the determined one or more associations, and update the user interface data such that the interface user interface includes the heatmap overlaying the map.

In some embodiments, the at least one attribute may comprise a depth attribute or a thickness attribute of a geological layer. The at least one attribute may comprise a measurement value associated with a sensor or structure located on the map.

In some embodiments, the attribute values may comprise an aggregation of two or more different attributes. For example, the two or more different attributes may comprise a first thickness of a first geological layer and a second thickness of a second geological layer, wherein an attribute value associated with a particular location corresponds to a sum of the first thickness and the second thickness at the particular location.

In some embodiments, the computing system may be further configured to calculate one or more predicted attribute values, wherein the predicted attribute values are associated with locations that are not associated with the identified attribute values. Calculating a predicted attribute value may be based at least in part upon a distance between the location associated with the predicted attribute value and a location associated with an identified attribute value.

Another aspect of the disclosure provides a computing system configured to access data stored in one or more databases in substantially real-time in response to input from a user in order to determine information related to measured data points and provide the determined information to the user in an interactive user interface, the computing system comprising: a computer processor; a database storing parameter values associated with a first parameter for a plurality of physical structures; and a computer readable storage medium storing program instructions configured for execution by the computer processor in order to cause the computing system to: generate user interface data for rendering the interactive user interface on a computing device, the interactive user interface including a first container and a second container, wherein the first container comprises a geographic map depicting a location of the plurality of physical structures; receive a selection of the first parameter and a first parameter value; determine one or more physical structures in the plurality of physical structures associated with a parameter value greater than the first parameter value; update the user interface data such that the geographic map depicts a location of the determined one or more physical structures; and update the user interface data such that the second container comprises a histogram identifying a number of the determined one or more physical structures that are associated with a parameter value greater than the first parameter value.

In some embodiments, the computer readable storage medium further stores program instructions that cause the computing system to update the user interface data such that each icon representing the location of the determined one or more physical structures is shaded a color that corresponds with the parameter value associated with the respective physical structure.

In some embodiments, the the computer readable storage medium further stores program instructions that cause the computing system to: receive a selection of a first icon in the geographic map representing a location of a first physical structure; receive a selection of a second icon in the geographic map representing a location of a second physical structure after receiving the selection of the first icon; and update the user interface data such that the interactive user interface displays a first depth graph associated with the first physical structure and a second depth graph associated with the second physical structure.

In some embodiments, the first depth graph is located to the left of the second depth graph in the interactive user interface. The first depth graph may comprise a geological layer at a first depth level and the second depth graph comprises a geological layer at a second depth level that is different than the first depth level, such that the geological layer in the first depth graph and the geological layer in the second depth graph are depicted in a different horizontal plane in the interactive user interface. The computer readable storage medium further may store program instructions that cause the computing system to: receive a selection of the geological layer in the first depth graph; and update the user interface data such that the geological layer in the first depth graph and the geological layer in the second depth graph are depicted in a same horizontal plane in the interactive user interface.

In some embodiments, the first depth graph comprises a first attribute graph plotting attribute values measured at different depths associated with the location of the first physical structure. The computer readable storage medium may further store program instructions that cause the computing system to: receive a selection of a second attribute graph plotting attribute values measured at different depths associated with the location of the second physical structure; and update the user interface data such that the first depth graph displays the second attribute graph adjacent to the first attribute graph. In some embodiments, the computer readable storage medium may, in response to a received indication that the second attribute graph is dragged over the first attribute graph, update the user interface data such that the first attribute graph reflects attribute values measured at different depths associated with the location of the first physical structure and the location of the second physical structure. In some embodiments, the first sensor reading graph comprises readings from a first sensor, wherein the second sensor reading graph comprises readings from a second sensor, and wherein the computer readable storage medium further stores program instructions that cause the computing system to: receive an indication that the second sensor reading graph is dragged over the first sensor reading graph; and update the user interface data such that the first sensor reading graph comprises the readings from the first sensor and the readings from the second sensor.

In some embodiments, the computer readable storage medium further stores program instructions that cause the computing system to: receive a selection of a first layer identifier in the geographic map, wherein a first geographic layer is associated with the first layer identifier; and update the user interface data such that the interactive user interface displays the first geographic layer in the geographic map under the depiction of the location of the plurality of physical structures.

Another aspect of the disclosure provides computing system configured to access one or more databases in substantially real-time in response to input from a user provided via an interactive user interface in order to display a preview of a shape in the interactive user interface, the computing system comprising: a computer processor; and a computer readable storage medium storing: a data structure including a plurality of shape files; and program instructions configured for execution by the computer processor to cause the computing system to: receive a search term; identify, in the data structure, a first shape file in the stored shape files that includes the search term, wherein the first shape file comprises a first file name with a first file extension; retrieve one or more shape files in the data structure that comprise the first file name, wherein each retrieved file comprises a file extension different than the first file extension; generate a shape preview based on data in the first shape file and data in the retrieved one or more shape files; and generate user interface data for rendering the interactive user interface on a computing device, the interactive user interface including the shape preview.

In some embodiments, one of metadata of the first file or code in the first file may comprise the search term.

In some embodiments, the computer readable storage medium may further store program instructions that cause the computing system to: receive a request to view a shape associated with the shape preview; and update the user interface data such that the interactive user interface comprises a geographic map and a representation of the shape in the geographic map.

In some embodiments, the shape preview comprises a depiction of a geological layer.

In some embodiments, the computer readable storage medium further stores program instructions that cause the computing system to: receive a request to rotate the shape preview from a first orientation to a second orientation; and update the user interface data such that the interactive user interface displays the shape preview in the second orientation.

In some embodiments, the computer readable storage medium further stores program instructions that cause the computing system to: receive a request to download the first file and each file in the one or more databases that comprises the first file name; and transmit the first file and each file in the one or more databases that comprises the first file name to a user device over a network.

In some embodiments, the computer readable storage medium further stores program instructions that cause the computing system to: receive a request to download the first file and each file in the one or more databases that comprises the first file name; aggregate the first file and each file in the one or more databases that comprises the first file name into a compressed data file; and transmit the compressed data file to the user device over the network.

In some embodiments, the content of each file in the one or more databases that comprises the first file name is not searchable. The shape preview may comprise a three-dimensional shape. The interactive user interface may further include a preview of text present in the first file. In some embodiments, at least a portion of a file name of each of the retrieved files comprises the first file name.

It has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The present disclosure describes various embodiments of interactive and dynamic user interfaces that are the result of significant development. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of maps and charts and may enable a user to more quickly and accurately access, navigate, assess, and digest the map and chart data than previous systems.

Further, the interactive and dynamic user interfaces described herein are enabled by innovations in efficient interactions between the user interfaces and underlying systems and components. For example, disclosed herein are improved methods of displaying geographic maps, determining cross-section layer information along paths, generating heatmaps on geographic maps, projecting paths onto a two-dimensional plane, and associating event and/or attribute data with physical locations on a projected path. The interactions and presentation of data via the interactive user interfaces described herein may accordingly provide cognitive and ergonomic efficiencies and advantages over previous systems.

Various embodiments of the present disclosure provide improvements to various technologies and technological fields. For example, existing data analysis technology is limited in various ways, and various embodiments of the disclosure provide significant improvements over such technology. Additionally, various embodiments of the present disclosure are inextricably tied to computer technology. In particular, various embodiments rely on detection of user inputs via graphical user interfaces, calculation of cross-section data and/or other attribute data based on those user inputs, generation of heatmaps based upon user-selected attributes or aggregations of user-selected attributes, generation of a two-dimensional path projection from a three-dimensional path, automatically displaying indications of attribute values and/or events along the path projected at locations corresponding to the attributes values and/or events. Such features and others are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic image data.

Additional embodiments of the disclosure are described below in reference to the appended claims, which may serve as an additional summary of the disclosure.

In various embodiments, computer-implemented methods are disclosed in which, under control of one or more hardware computing devices configured with specific computer executable instructions, one or more aspects of the above-described embodiments (including one or more aspects of the appended claims) are implemented and/or performed.

In various embodiments, non-transitory computer-readable storage mediums storing software instructions are disclosed, wherein, in response to execution by a computing system having one or more hardware processors, the software instructions configure the computing system to perform operations comprising one or more aspects of the above-described embodiments (including one or more aspects of the appended claims).

Further, as described herein, various embodiments of the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

BRIEF DESCRIPTION OF THE DRAWINGS

FIGS. 9A-9C illustrate a user interface that displays cross-section information corresponding to selected paths on a map, in accordance with some embodiments.

DETAILED DESCRIPTION

Figure 1A:
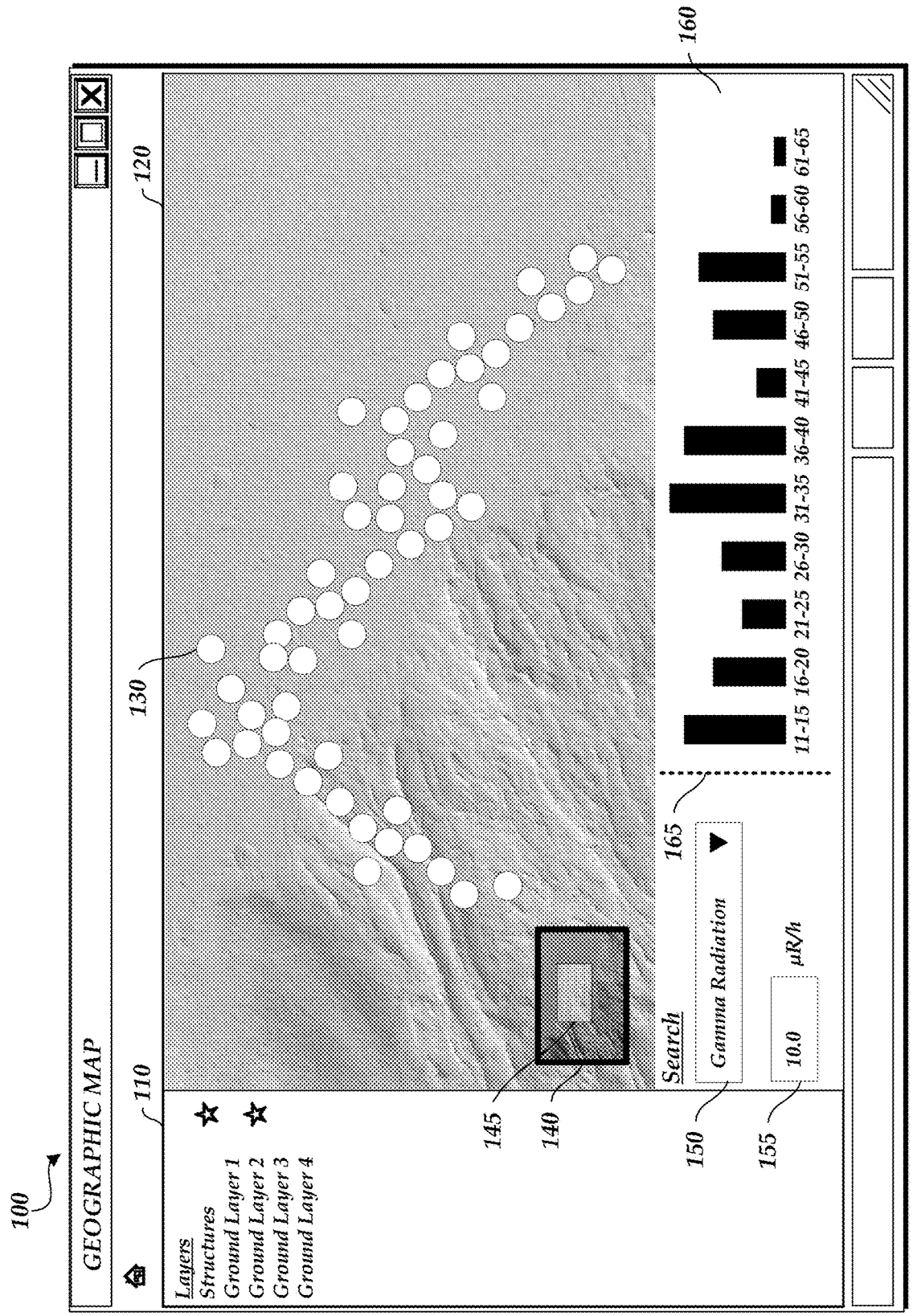
FIGS. 1A-1B illustrate a user interface that displays a location of physical structures in a geographic area.

Overview: Data Analysis Via Interactive User Interfaces

As described above, it can become very difficult for the user to identify relevant data and perform an analysis when a database includes a large amount of data. This may be especially true if the user would like to compare two or more data sets that include measurements captured over various geological layers, where the data sets correspond to measurements taken in physical apparatuses (such as by sensors in oil wells, mines, or geological formations). For example, in the case of structures such as mines or oil wells, users with different specialties (e.g., chemists, physicists, petroleum physicists, etc.) may analyze different portions of the data that correspond with their specialty. These analyses may then be combined and presented to a geologist or other user in a user interface that includes a geographic map. However, the displayed data is static as the analyses have already been performed. It may then be difficult or burdensome for the geologist or other user to try to identify trends in the data and/or isolate current or future issues with the sensors, structures, geological layers, and/or the like.

Accordingly, disclosed herein are various systems and methods for displaying various graphs in an interactive user interface in substantially real-time in response to input from a user in order to determine information related to measured data points and provide the determined information to the user in the interactive user interface. For example, a first computing device may be configured to retrieve data measured by various sensors and compress the retrieved data so that the compressed data can be transported to and stored in one or more databases in an efficient manner. The sensors may be located in various physical structures, such as oil wells, mines, or geological structures or formations, and may be at various depths above and/or below the ground or the ocean surface. The sensors may include any available type of sensor, such as temperature, pressure, humidity, etc. sensors. In one embodiment, a sensor array may be in the form of a cable, such as a fiber optic cable, to provide a distributed acoustic sensing (DAS) system. For example, a single fiber optic cable may become a sensing element that includes hundreds to thousands of sensors that can detect vibrations and/or other physical parameters. As pulsed light is transmitted through the fiber optic cable, the fiber optic cable may act as a distributed interferometer and an optoelectronic device coupled to the fiber optic cable (e.g., Optical Time Domain Reflectometer (OTDR) instrumentation) may monitor a backscatter noise signature (e.g., a coherent Rayleigh backscatter noise signature) in the fiber optic cable. The optoelectronic device may measure the intensity of the reflected light after the light pulse is transmitted and changes in the reflected intensity of successive light pulses from the same region in the fiber optic cable can be determined. The intensity of the reflected light may be dependent on a strain and/or a temperature at various locations around the fiber optic cable. The optoelectronic device may be able to detect variations in the strain and/or temperature simultaneously at all regions in the fiber optic cable. The fiber optic cable may be hundreds of meters long and the sensors may be spaced evenly (or unevenly) throughout. In other embodiments, other types of sensors may be used.

The one or more databases may be located on land and coupled to the sensors via a communication medium, such as a cable or a wireless connection. Each instance of data measured by a sensor may include a plurality of parameters. For example, each instance of measured data may include an amplitude of the measured data, a depth at which the data was measured, a time at which the data was measured, a frequency range of the measured data (which may correspond to an octave in a plurality of octaves), and/or other like parameters.

A second computing device (e.g., the computing system 1700 of FIG. 17 described below) may retrieve the data stored in the one or more databases and generate an interactive user interface to display the data. For example, the interactive user interface may include a geographic map and indication of a location of various system components, such as structures (e.g., mines, oil wells, geological formations, and/or the like) in the examples discussed herein. The user may also be able to cause the system to generate a two-dimensional cross-section of layer data along one or more user-defined paths in the geographic map, and/or generate heatmaps indicating one or more attribute values across the geographic map. The interactive user interface may include various filters that allow a user to view a subset of the available structures. The user interface may be interactive in that the user interface may allow the user to select one or more structures, which causes the user interface to display attribute graphs (e.g., depth graphs) for each of the selected structures in a depth view. The user may be able to manipulate each of the depth graphs to view additional sensor data, identify trends, and/or the like. The user may also be able to view event timelines associated with one or more structures, and/or project a path or trajectory associated with a structures onto a two-dimensional plane, and view attribute values or events associated with locations on the projected path. The interactive user interfaces are described in greater detail below with respect to FIGS. 1A through 16.

The systems and methods described herein may provide several benefits. For example, the systems and methods described herein may improve the usability of the user interface by providing geographic maps and graphs that can be manipulated by a user in a concurrent manner, thereby allowing the user to identify trends or other information associated with the geographic maps and/or graphs. As another example, the systems and methods described herein may reduce the processor load while the user is interacting with the user interfaces by presenting depth graphs in a concurrent manner such that the user may not have to request sensor data associated with different structures separately and have the second computing system use additional processing resources to load and display the sensor data. Thus, the systems and methods described herein may improve the usability of the user interface.

As used herein, a "geological layer" or "zone" can be any stratum (e.g., a layer of sedimentary rock or soil with internally consistent characteristics that are distinguished from the characteristics of other layers) or geological formation (e.g., a combination of strata that may have a comparable lithology, facies, or other similar properties). Examples of a geological layer may include Hastings Beds, Kimmeridge Clay, Oxford Clay, Ferris Formation, and/or the like.

References herein to "databases" may refer to any type of data structure for storing and/or organizing data, including, but not limited to, relational databases (for example, Oracle database, mySQL database, and the like), spreadsheets, XML files, and text files, among others. The various terms "database," "data store," and "data source" may be used interchangeably in the present disclosure.

While the disclosure is described herein with respect to particular applications, such as mining, oil wells, and/or the like, this is not meant to be limiting. For example, the systems and methods described herein may facilitate the display of data captured by or associated with any physical apparatus or structure. Such physical apparatuses or structures may be those that include sensors used to measure physical parameters.

Examples of Manipulating the Geographic Map in an Interactive User Interface

Figure 1B:
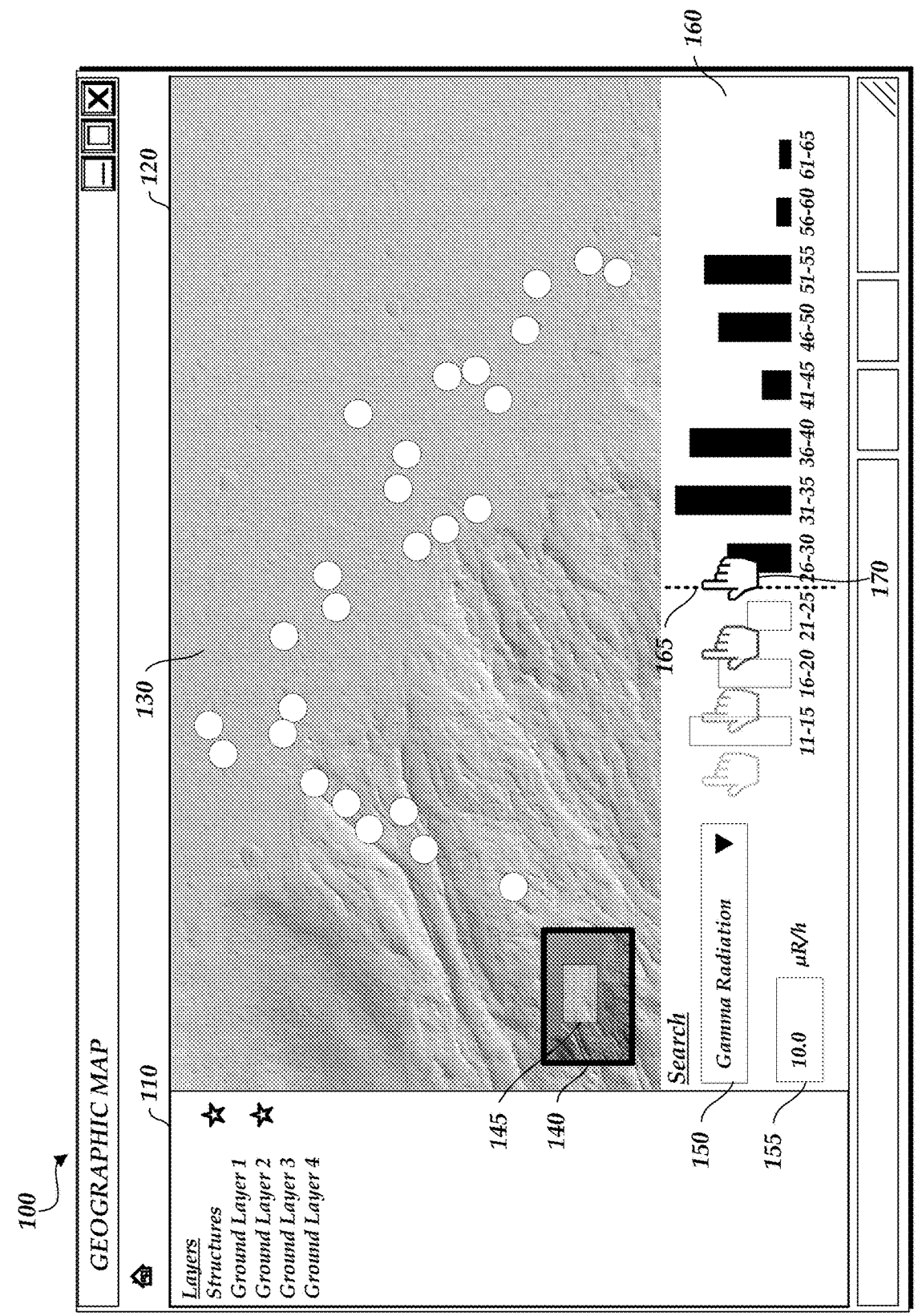

FIGS. 1A and 1B illustrate a user interface 100 that displays a location of physical structures in a geographic area. As illustrated in FIG. 1A, window 120 includes a geographic map with icons or markers that represent the locations of physical structures (e.g., mines, oil wells, geological structures or formations, and/or the like). For example, icon 130 represents the location of a first structure. Window 110 includes a list of selectable layers that, when selected, are displayed in the window 120. The layers may represent physical structures (e.g., mines, oil wells, geological structures or formations, etc.), geological layers, and/or the like. For example, as illustrated in FIG. 1A, a "Structures" layer and a "Ground Layer 2" layer are selected. Thus, the geographic map in the window 120 displays data associated with each layer.

The window 120 may include a mini-map 140 that displays a larger geographic area than is depicted in the window 120 and indication of the portion of the larger geographic area that is depicted in the window 120 (e.g., via box 145). The user may adjust the portion of the larger geographic area that is depicted in the window 120 by moving the box 145 within the mini-map 140.

The user interface 100 may further include filters. For example, the user may select filters in drop-down box 150 and/or values associated with the selected filters to pare the data depicted in the window 120. As illustrated in FIG. 1A, the user has selected the "gamma radiation" filter and entered a gamma radiation value of 10 μR/h in field 155. Thus, the window 120 only displays structures that have a value of the attribute (e.g., gamma radiation) satisfying the filter value (e.g., greater than 10 μR/h). Although not shown, the user may provide additional filters (that are or that are not dependent on a value provided by the user) to further pare the data depicted in the window 120. Other filters may include spontaneous potential, resistivity logs, borehole compensated, formation density compensated, compensated neutron, nuclear magnetic resonance, and/or the like.

The user interface 100 may further include a histogram 160. The histogram 160 may be associated with a selected filter such that the histogram 160 provides a more detailed view of the number of structures that satisfy the selected filter. For example, the histogram 160 indicates a number of structures that have a gamma radiation within different value ranges, such as between 11-15 μR/h, between 16-20 μR/h, between 21-25 μR/h, and so on.

A marker 165 may be displayed adjacent to the histogram 160 and can be used by the user to further filter the number of structures displayed in the window 120. For example, as illustrated in FIG. 1B, the user may move the marker 165 from its initial position to the left of the histogram 160 to a position between the 21-25 μR/h and 26-30 μR/h buckets using cursor 170. By moving the marker 165 to its position in FIG. 1B, any structures associated with a gamma radiation value below 26 μR/h may be hidden from view in the window 120. Thus, the position of the marker 165 may dictate which structures are displayed and which structures are not displayed in the window 120. The position of the marker 165 may or may not also cause an update to the value entered in the box 155 (e.g., the value entered in the box 155 may be updated to read 25 μR/h in some embodiments).

Figure 2:
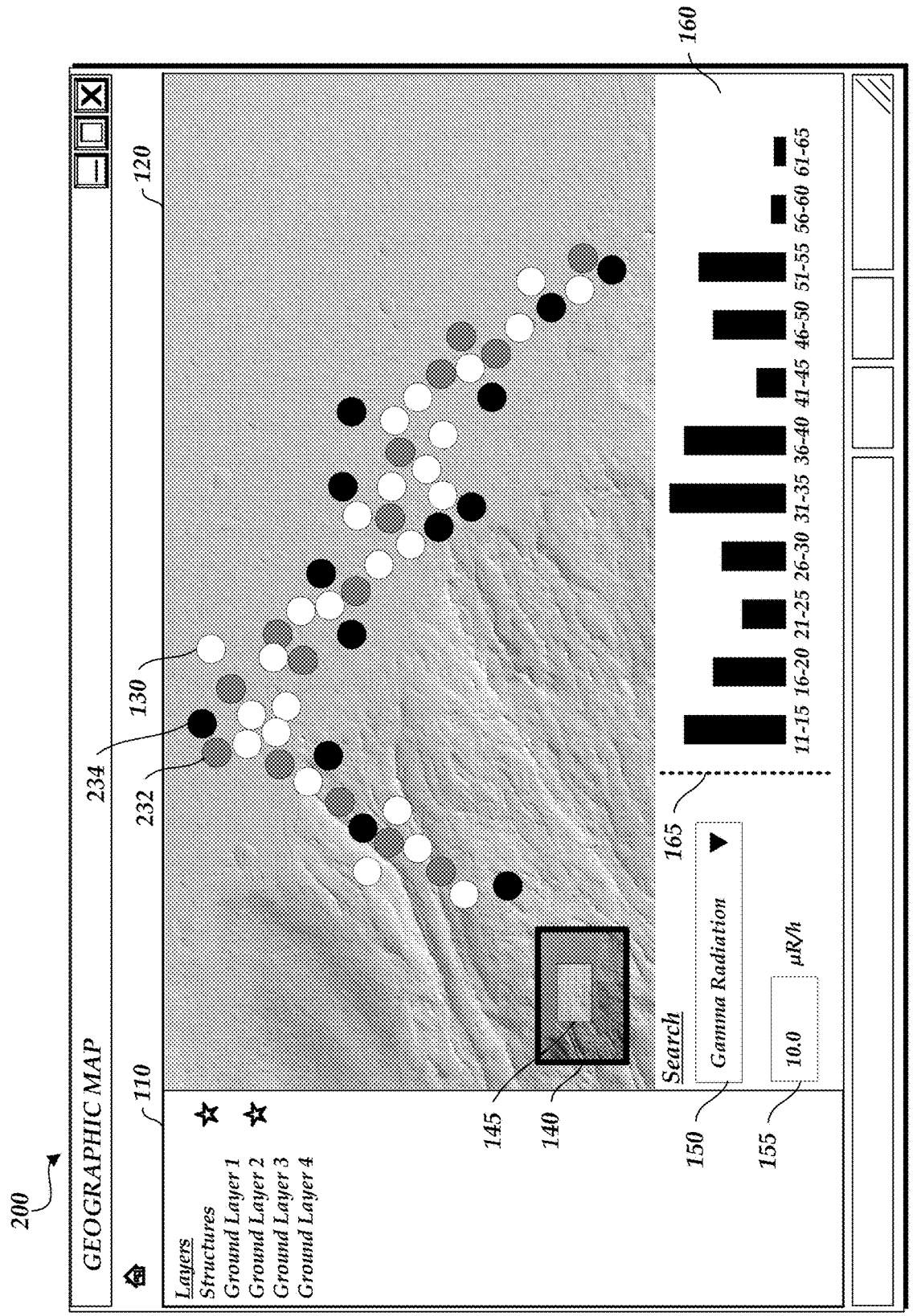
FIG. 2 illustrates another user interface that displays a heat map identifying the relative value of a selected parameter for a plurality of physical structures within a geographic area.

FIG. 2 illustrates another user interface 200 that displays a heat map identifying the relative value of a selected parameter for a plurality of structures within a geographic area. The heat map may be displayed in the window 120 such that the icons representing the structures are color shaded according to the value of the selected parameter associated with the respective structure. Alternatively, the icons may be graphically represented in a different way depending on the value of the selected parameter (e.g., a number associated with the value of the selected parameter may be displayed near or on each icon, each icon may blink at a frequency corresponding to the value of the selected parameter, etc.). The user interface 200 may include a legend to indicate the meaning of the different graphical representations of the icons (not shown).

As illustrated in FIG. 2, the selected parameter is "gamma radiation" as indicated by the drop-down box 150. The icons may be shaded lighter colors to indicate low values of gamma radiation and may be shaded darker colors to indicate high values of gamma radiation. For example, the icon 130 may be associated with a structure that has low gamma radiation levels (e.g., 11 μR/h), icon 232 may be associated with an structure that has medium gamma radiation levels (e.g., 26 μR/h), and icon 234 may be associated with an structure that has high gamma radiation levels (e.g., 41 μR/h). In some embodiments, not shown, the icons are each shaded a color within a color range that has different colors and/or intensity of colors, where the shading is dependent on the value of the selected parameter for the structure associated with the respective icon. The colors may overlap and/or blend between icons that represent structures.

Figure 3A:
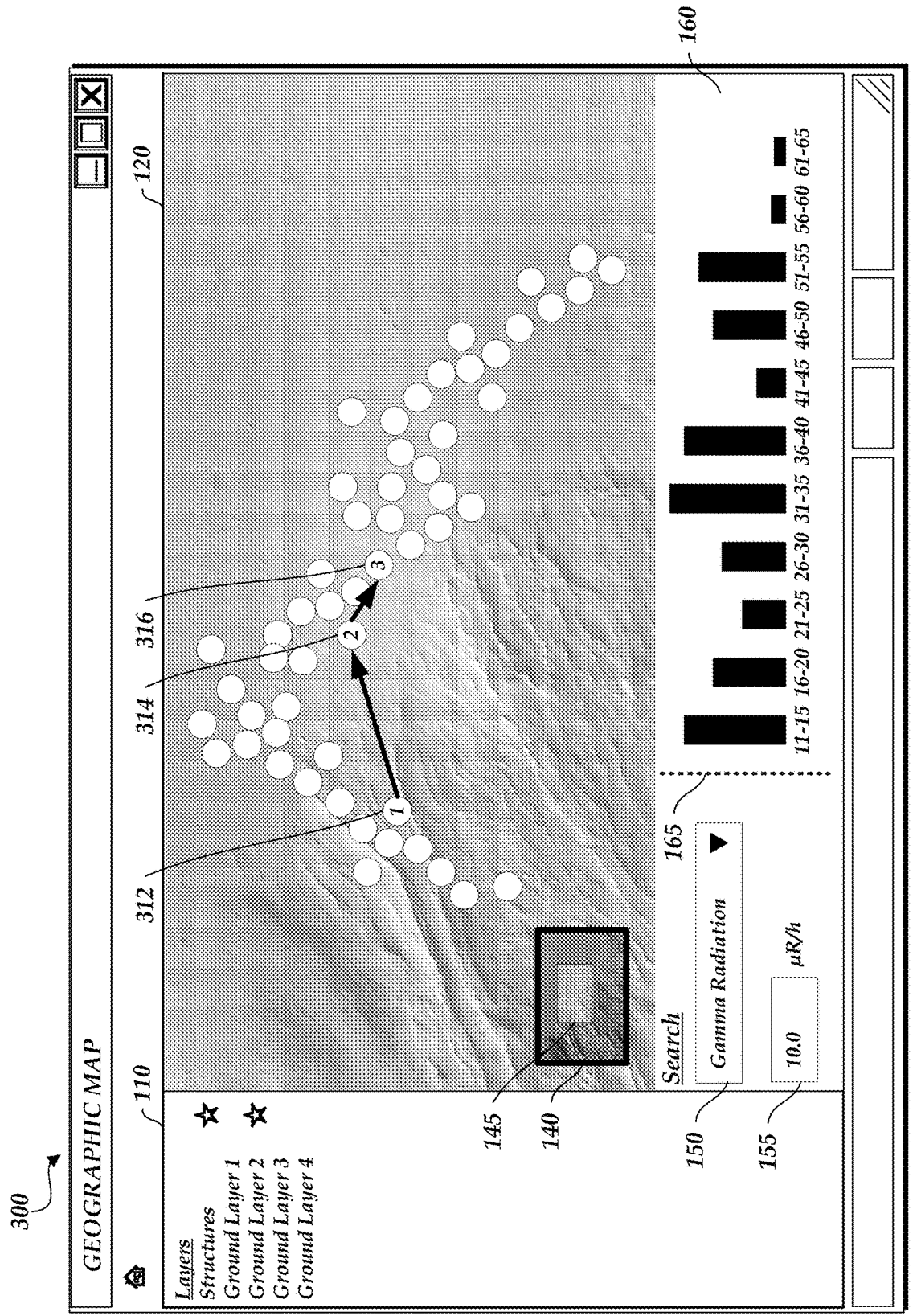
FIG. 3A illustrates another user interface that displays the selection of a plurality of physical structures within a geographic area.

FIG. 3A illustrates another user interface 300 that displays the selection of a plurality of structures within a geographic area. As described herein, any of the icons representing structures can be selected by the user in the window 120. The user may select icons at once or in a specific order. As illustrated in FIG. 3A, the user has selected icon 312 first (corresponding to structure #1), then icon 314 (corresponding to structure #2), and then icon 316 (corresponding to structure #3). The window 120 may include arrows or similar markers to visually provide feedback to the user to indicate the order in which the icons were selected. Selection of an icon representing an structure may cause the user interface 300 to display the depth view, which is described in greater detail below with respect to FIGS. 3B-3C and 5A-7C. Likewise, selection of an icon or button in the depth view may cause the user interface 300 to display one or more structures within a geographic area, as illustrated, for example, in FIG. 3A.

Figure 3B:
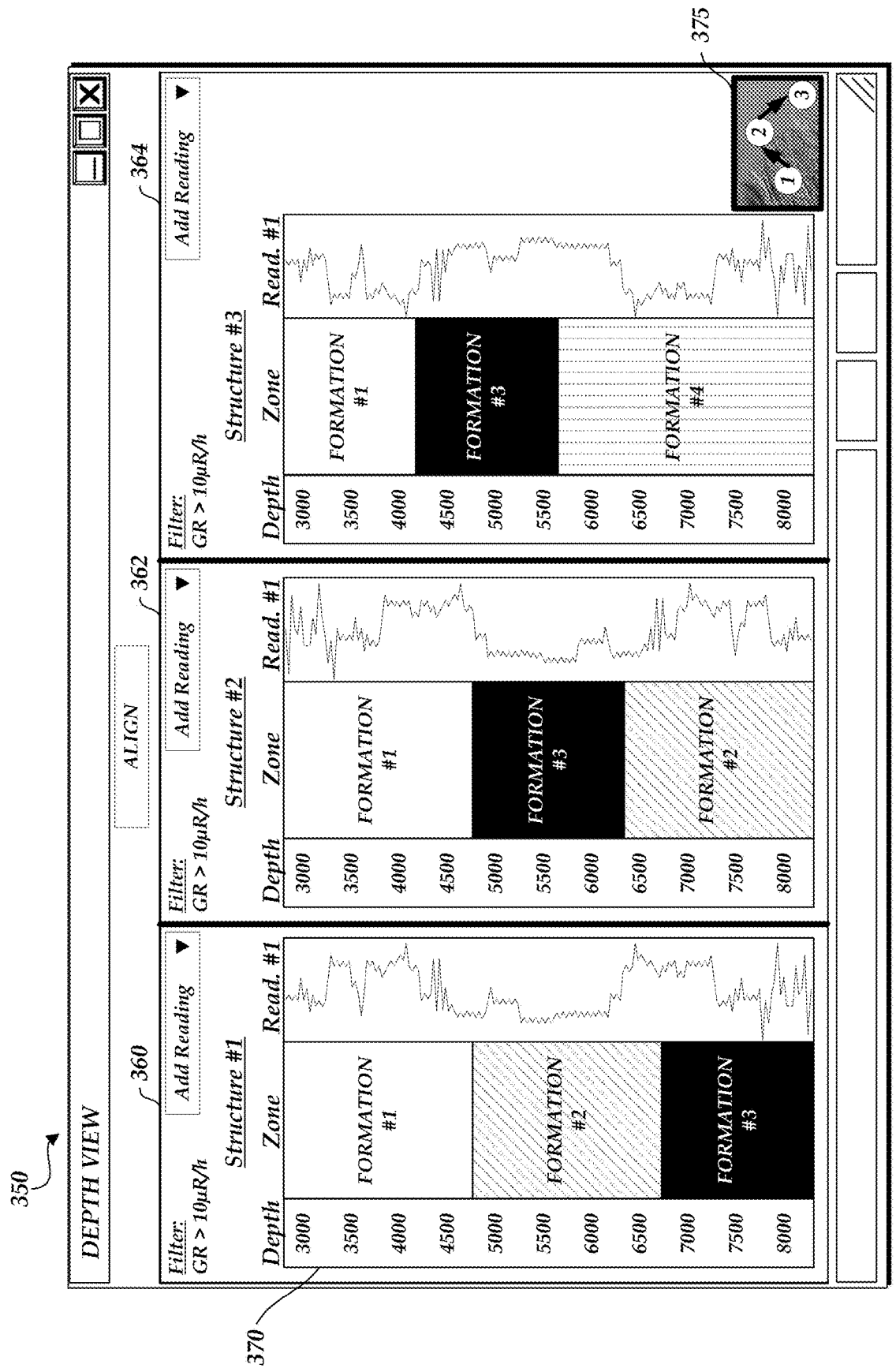
FIGS. 3B-3C illustrate another user interface that displays depth graphs for the selected plurality of physical structures.
Figure 3C:
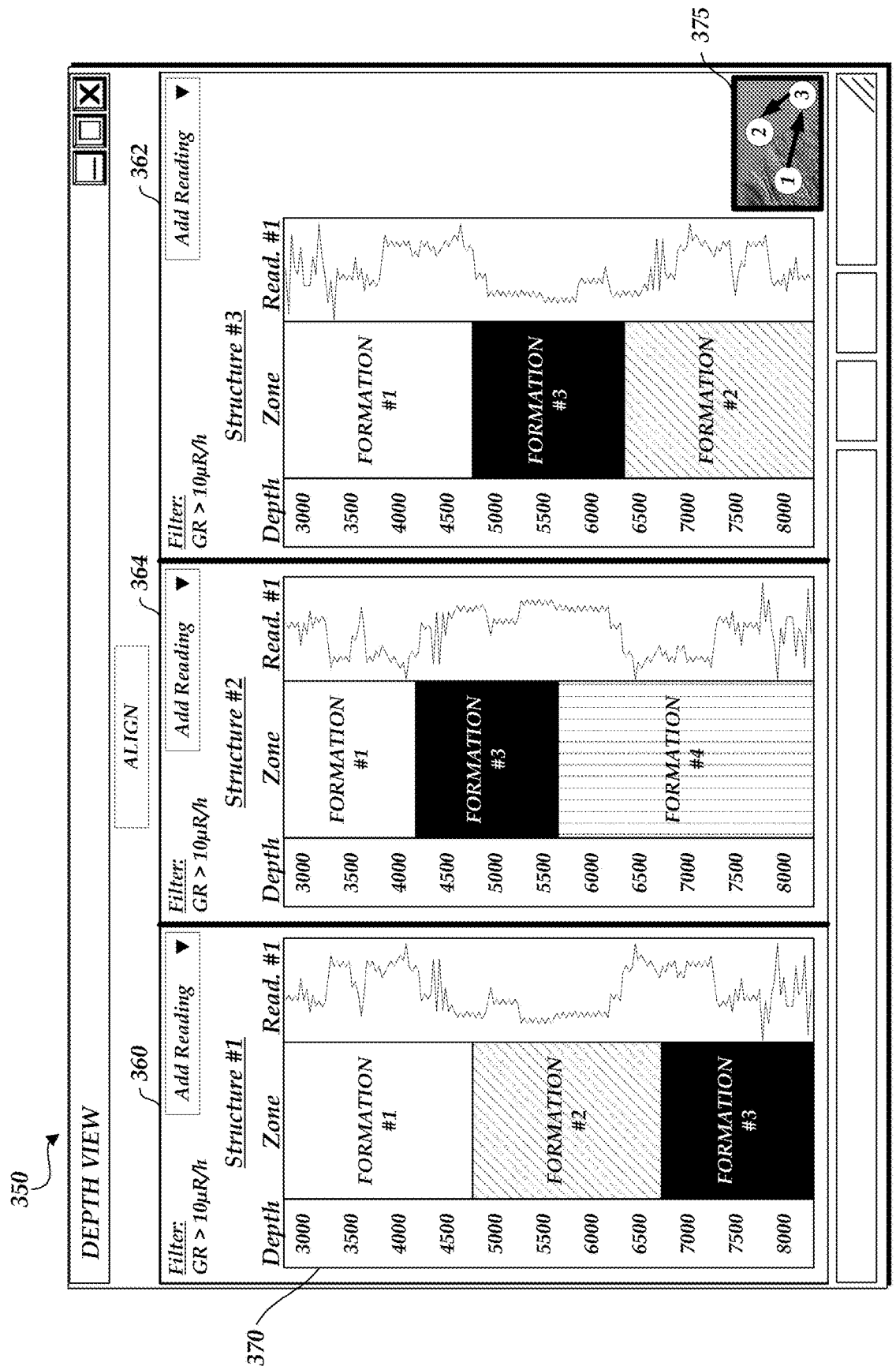

FIGS. 3B and 3C illustrate another user interface 350 that displays depth graphs for the selected plurality of structures. As illustrated in FIG. 3B, the depth view illustrated in the user interface 350 includes a window 360 associated with structure #1, a window 362 associated with structure #2, and a window 364 associated with structure #3. The windows 360, 362, and 364 may be displayed in the user interface 350 in the same order in which the icons 312, 314, and 316 were selected. Each window 360, 362, and 364 may identify the associated structure, any filters that were applied in the user interface 300 of FIG. 3A (e.g., a filter like selecting to only view structures with gamma radiation values above 10 μR/h), the functionality to add additional sensor readings, and a depth graph, such as depth graph 370.

Each depth graph may present a cross-section of the composition of the ground at a location of the respective structure. For example, the depth graph 370 includes a y-axis that that identifies various depth levels and that identifies the depth levels at which various geological layers or zones are located within or surrounding the structure #1. In addition, the depth graph 370 may include a line graph (or other such graph) that plots the values measured from a sensor within the structure #1 at the depth levels indicated along the y-axis. In some embodiments, these graphs that plot attribute values measured along different depth levels may be referred to as "sensor reading graphs" or "reading graphs." The values may be measured from the sensor for a single instance of time. The user may be able to adjust a time-axis such that the depth graph 370 displays values measured from the sensor at different time instances (not shown). As described in greater detail below, the depth graphs are not limited to displaying the readings from one sensor. The user may add additional line graphs that concurrently plot the values measured from other sensors within an structure.

The depth view in the user interface 350 may further include a mini-map 375. The mini-map 375 may include a smaller version of the geographic map illustrated in the window 120 and display the selected icons, as described above with respect to FIG. 3A, with an indication of the order in which the icons were selected.

In an embodiment, the windows 360, 362, and 364 can be manipulated such that the order in which they are displayed in the user interface 350 can be adjusted. For example, windows 362 and 364 can be swapped as illustrated in FIG. 3C. The user may adjust the order in which the windows 360, 362, and/or 364 are displayed by selecting and dragging a window to a new location, by entering a command using an input device (e.g., a keyboard, a mouse, etc.), and/or the like. In response to swapping windows 362 and 364, the mini-map 375 may be updated to reflect the change. For example, the mini-map 375 may adjust the arrows or similar markers to indicate that the order of the selected structures is now structure #1, structure #3, and structure #2.

Displaying information about the structures in the correct order may aid users in identifying trends. For example, a user may wish to determine whether the geographic map is accurate in displaying information about the selected structures, such as whether the location, geological layers, and/or the like are correctly displayed. The order may also be important in viewing the progression in geological topologies, which may aid in identifying trends in the data or current or future issues with the sensors, structures, geological layers, and/or the like.

Figure 4A:
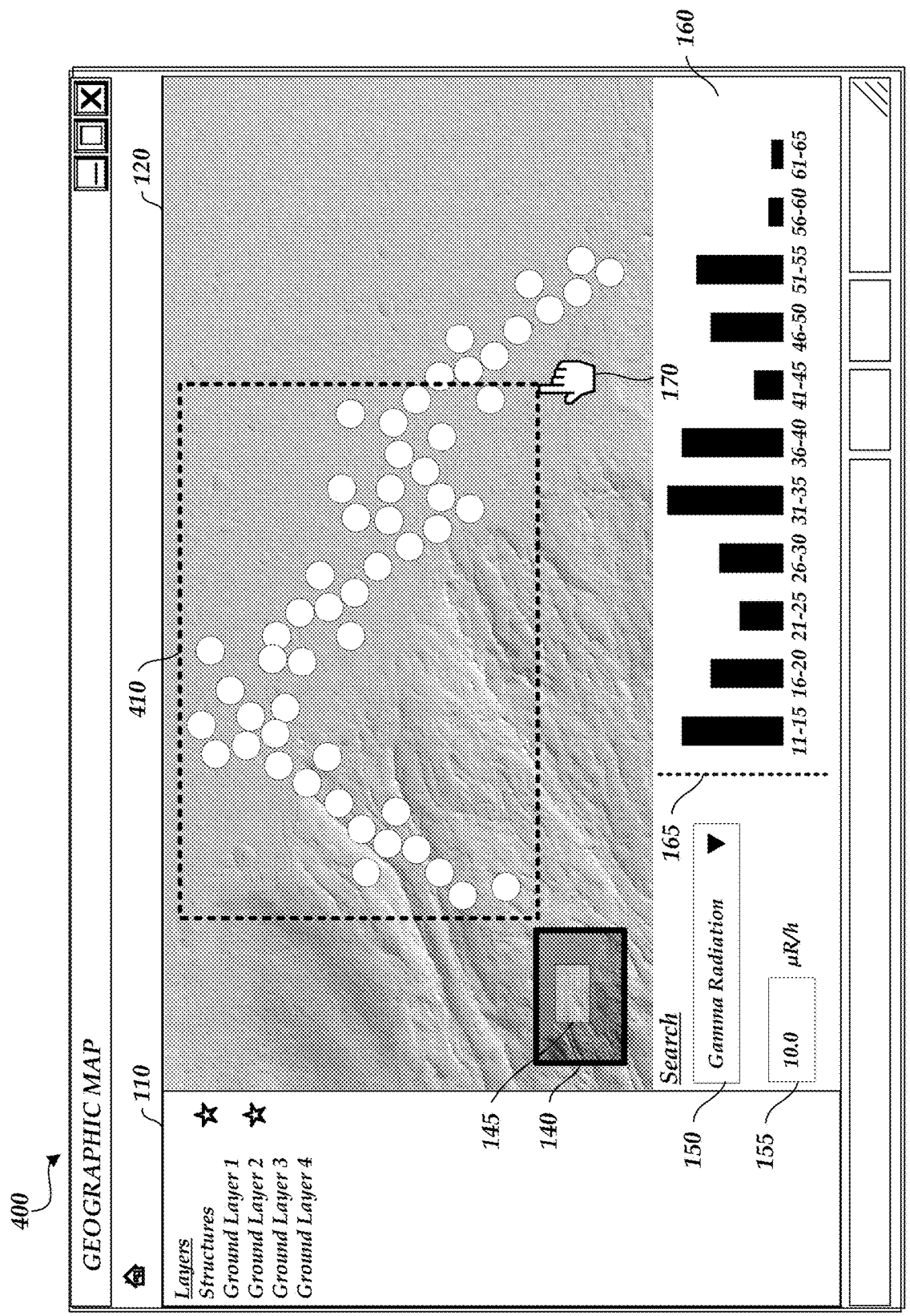
FIG. 4A illustrates another user interface that displays the selection of a plurality of physical structures within a geographic area.

FIG. 4A illustrates another user interface 400 that displays the selection of a plurality of structures within a geographic area. As illustrated in FIG. 4A, the user may select one or more structures by creating a lasso 410 using the cursor 170. Alternatively, the user may select one or more structures in any manner, such as by entering a command into an input device, providing a voice command, and/or the like.

The user may further provide one or more parameters that are associated with structures (e.g., values derived from the sensors of the structures) that are of interest. The user may provide the parameters in any way as described herein.

Figure 4B:
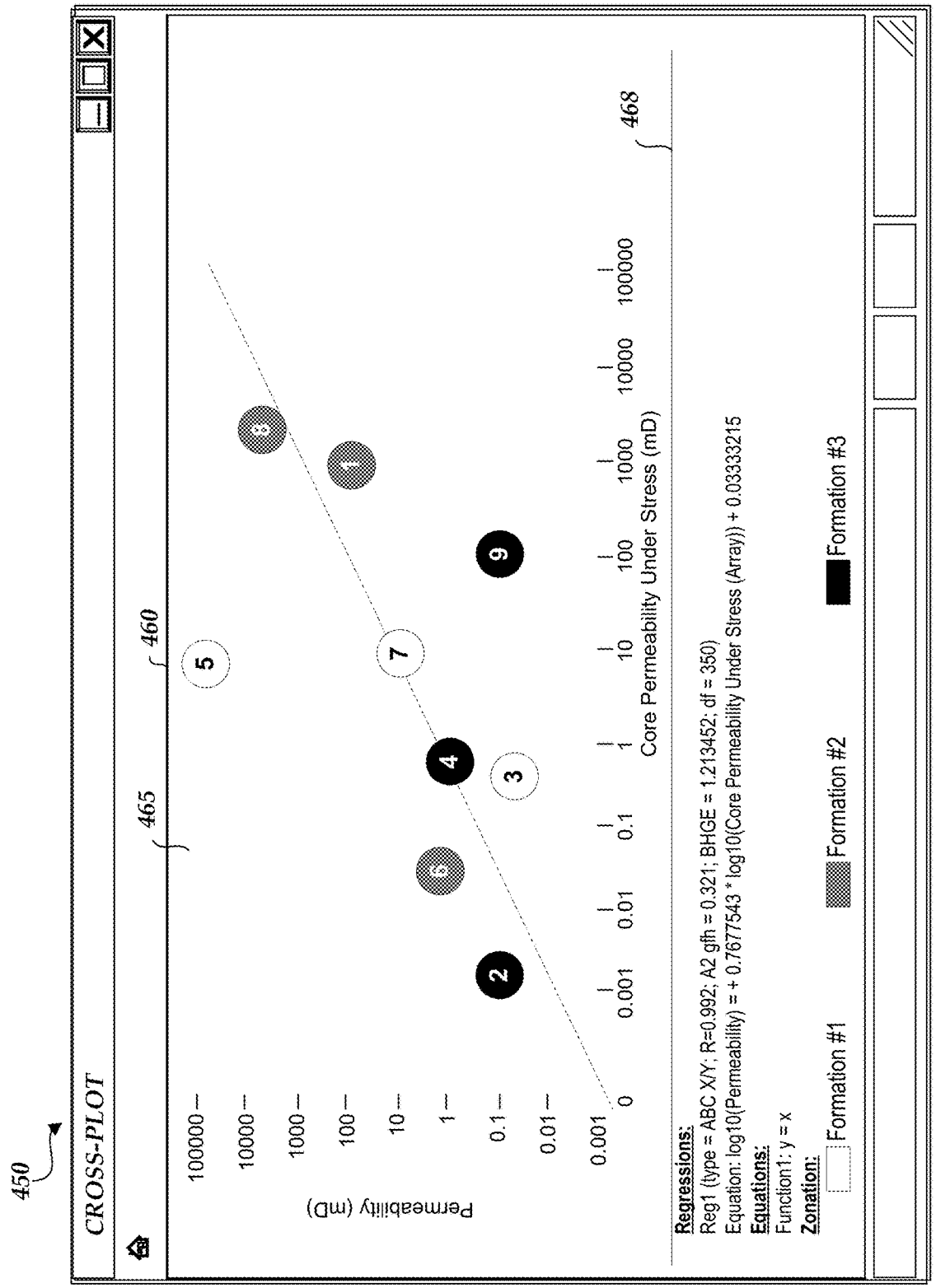
FIG. 4B illustrates another user interface that displays a cross-plot graph of parameters associated with the selected plurality of physical structures.

FIG. 4B illustrates another user interface 450 that displays a cross-plot graph 465 of parameters associated with the selected plurality of structures. For example, the user, using the user interface 400, may select two parameters: "permeability" and "core permeability under stress." Based on the selection of the parameters and the icons representing the structures, the user interface 450 may be displayed that includes a window 460 that includes the cross-plot graph 465 and a box 468 that includes information related to the data in the cross-plot graph 465.

The cross-plot graph 465 may plot the two selected parameters against each other for each selected structure. For example, as illustrated in FIG. 4B, the cross-plot graph 465 plots "permeability" versus "core permeability under stress" for nine structures #1 through #9. For simplicity, only nine structures are depicted. However, the cross-plot graph 465 may plot the parameters for each structure selected in the user interface 400.

In some embodiments, the selected parameters apply to a portion of an structure. For example, the selected parameters may apply to a specific geological layer. Alternatively, the user may actively limit the selected parameters to apply to only a portion of an structure. The icons associated with the structures in the cross-plot graph 465 may be color shaded or otherwise graphically differentiated to indicate the geological layer to which the selected parameters correspond.

The box 468 may display regressions and/or equations used to plot the data in the cross-plot graph 465. The box 468 may further include a legend that identifies the geological layer that corresponds with each color shade (or other graphical differentiation).

Figure 5A:
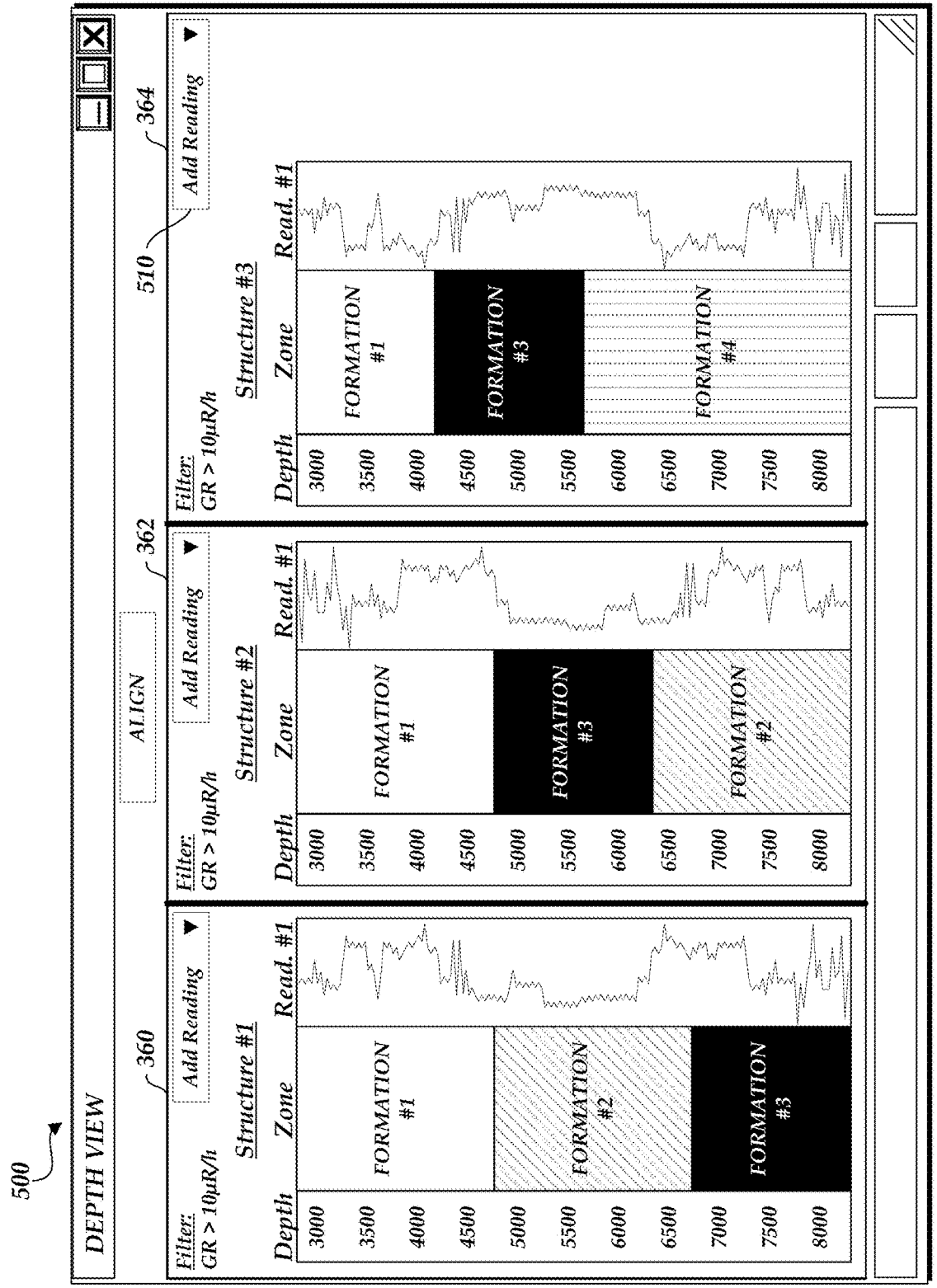
FIGS. 5A-5D illustrate another user interface that displays the addition of a sensor reading to the depth graphs for a plurality of physical structures.

FIGS. 5A-5D illustrate another user interface 500 that displays the addition of a sensor reading to the depth graphs for a plurality of structures. As illustrated in FIG. 5A, in the depth view depicted in the user interface 500, the user may choose to add one or more additional sensor readings for any of the structures identified in the windows 360, 362, and/or 364. For example, the user may select drop-down box 510 to add a new reading to be displayed in association with the structure #3.

Figure 5B:
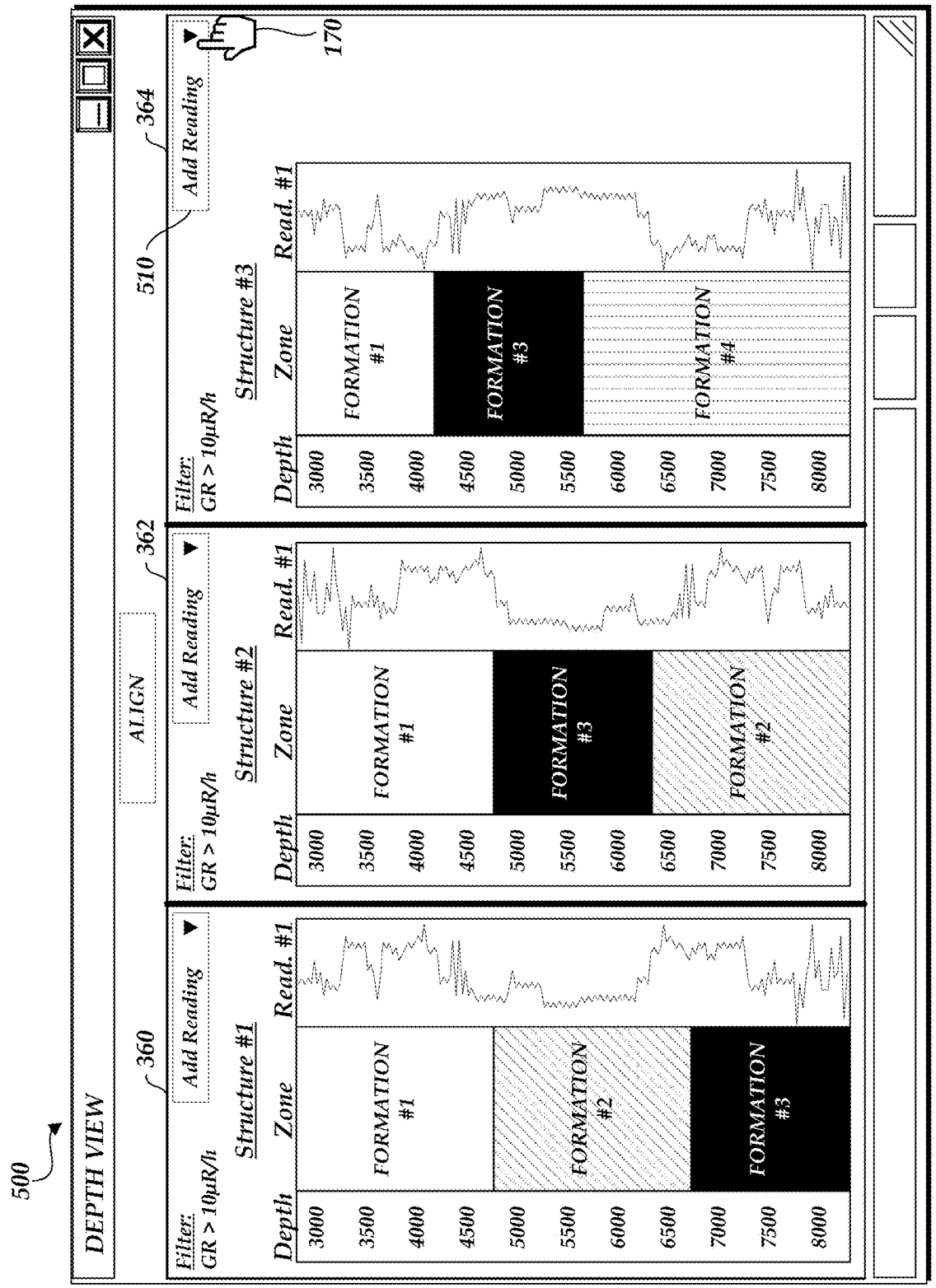
Figure 5C:
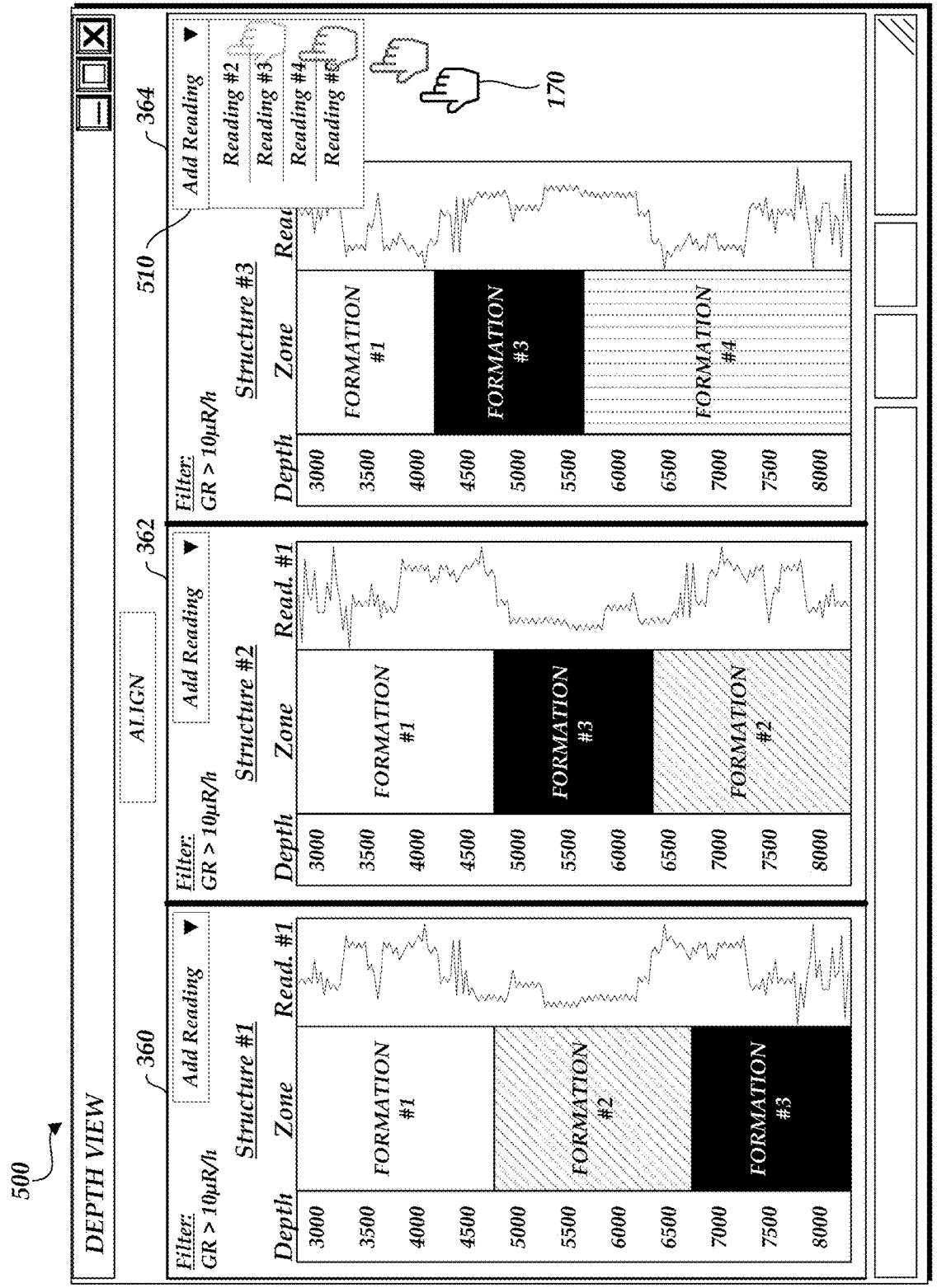

As illustrated in FIG. 5B, the user selects the drop-down box 510 using the cursor 170. In response to selection of the drop-down box 510, the user interface 500 may display a list of available sensor readings associated with the structure #3 (e.g., sensor readings that have been captured by one or more sensors associated with or within the structure #3), as illustrated in FIG. 5C. In an embodiment, to display an additional sensor reading, the user can select and hold a desired sensor reading identifier and drag the identifier to a location within the window 364 and release. Alternatively, not shown, the user may merely click or otherwise select the desired sensor reading identifier and the sensor measurements may be automatically displayed within the window 364.

Figure 5D:
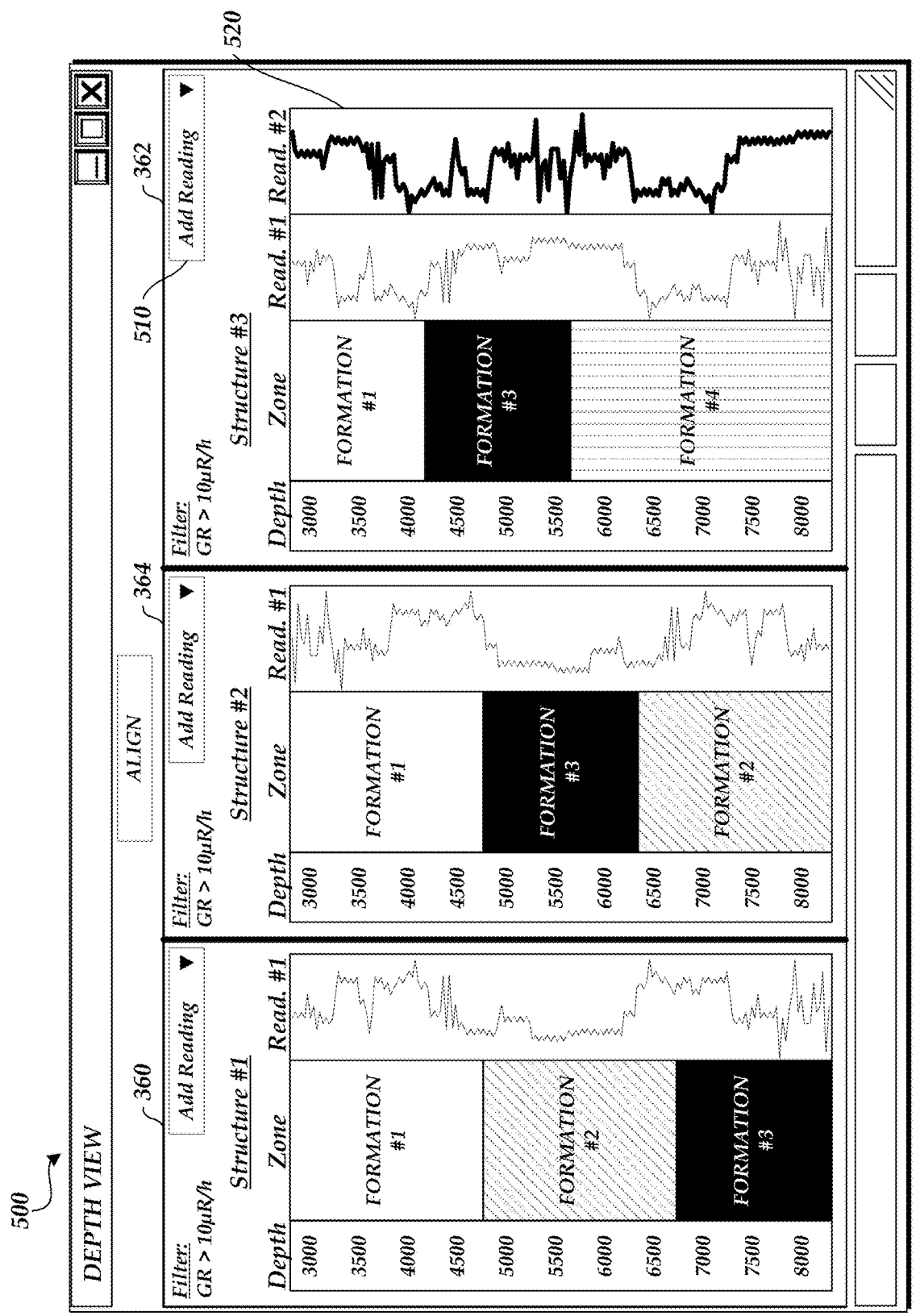

Once the desired sensor reading is selected, the sensor measurements may be displayed within a graph 520 in the window 364 as illustrated in FIG. 5D. In this way, the user interface 500 may allow the user to compare data from two or more sensors (or different sensor readings derived from the same sensor) within the same structure.

Figure 6A:
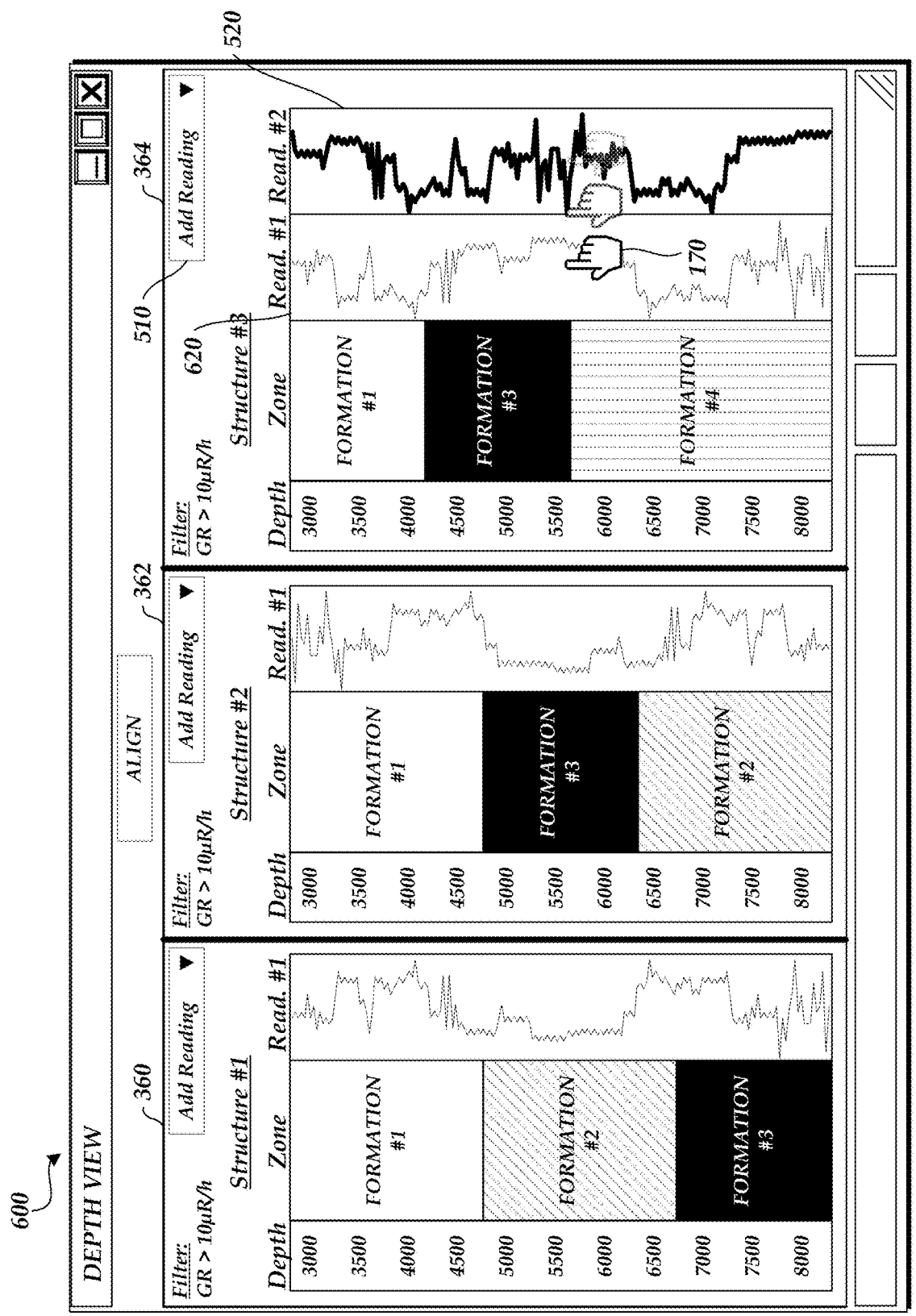
FIGS. 6A-6B illustrate another user interface that displays the overlay of one sensor reading onto another sensor reading in the depth graphs for a plurality of physical structures.
Figure 6B:
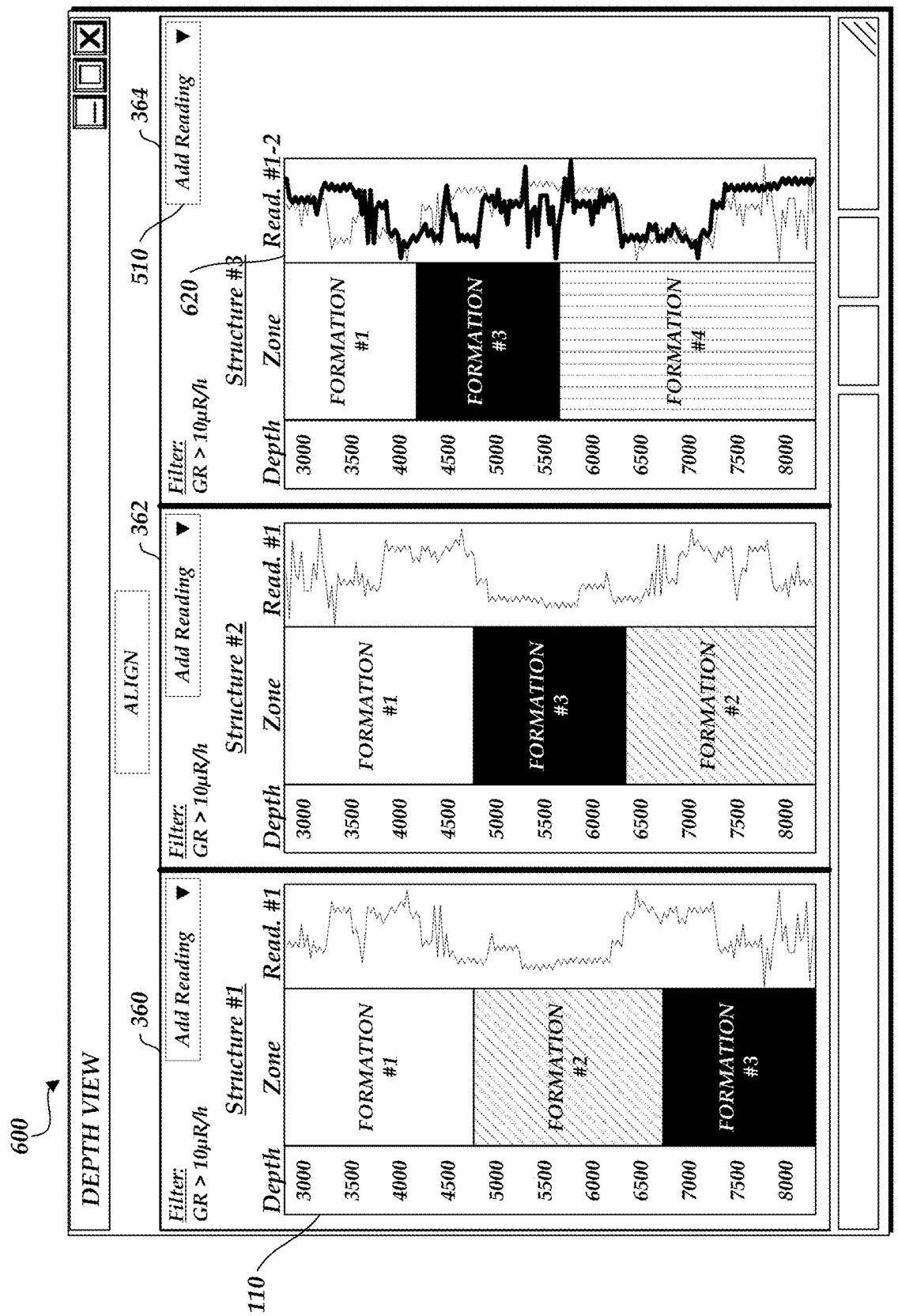

FIGS. 6A-6B illustrate another user interface 600 that displays the overlay of one sensor reading onto another sensor reading in the depth graphs for a plurality of structures. As illustrated in FIG. 6A, using the cursor 170, the user can select the graph 520. By selecting and holding, the graph 520 may be dragged within the window 364. For example, the graph 520 can be dragged over graph 620 by moving the cursor 170 over the graph 620.

As illustrated in FIG. 6B, if the cursor 170 is released while the graph 520 overlays the graph 620, then the sensor data plotted in the graph 520 may be plotted in the graph 620 in conjunction with the sensor data already plotted in the graph 620. Thus, the graph 620 may include two different sensor readings.

Figure 7A:
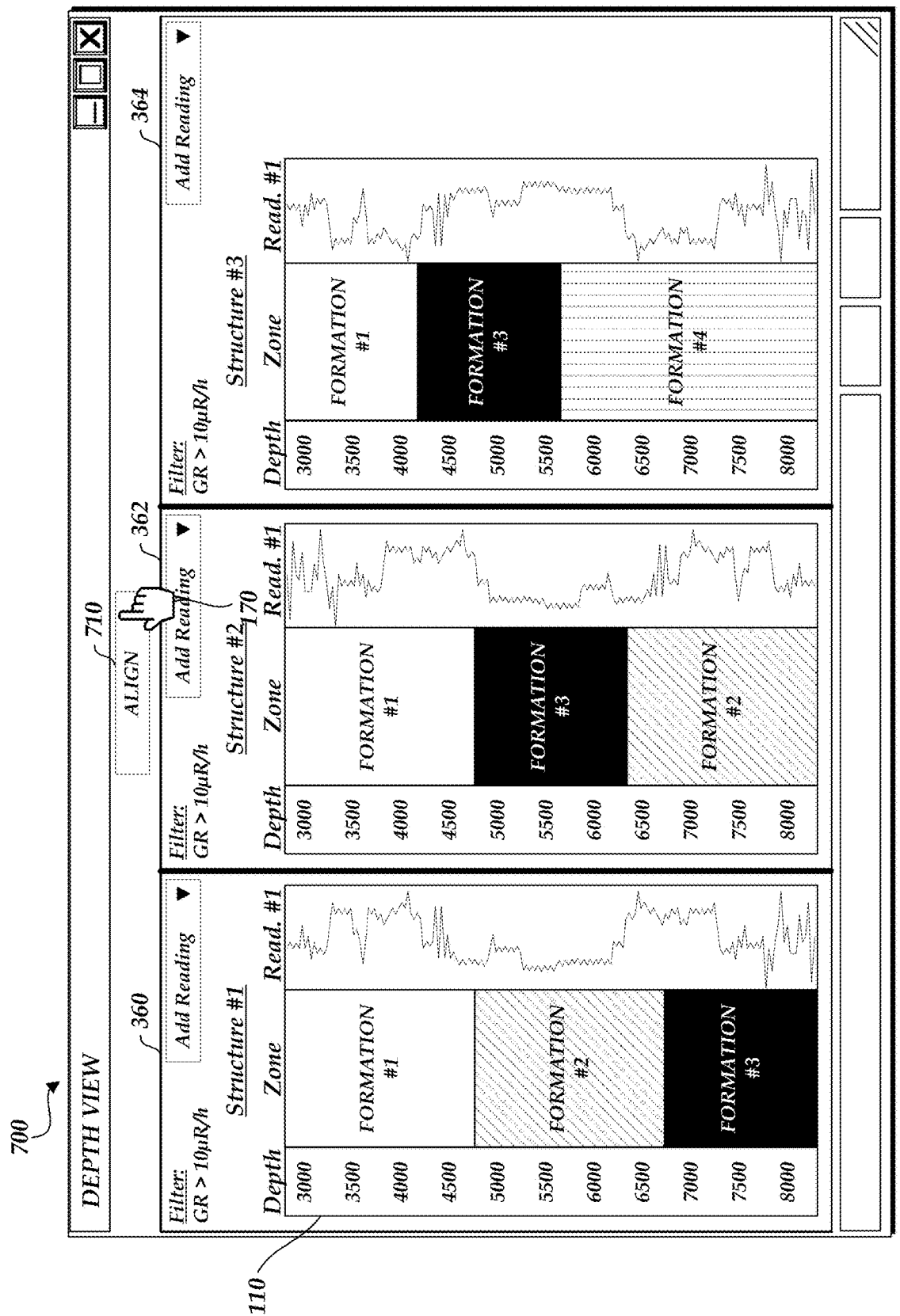
FIGS. 7A-7C illustrate another user interface that displays the alignment of depth graphs.
Figure 7B:
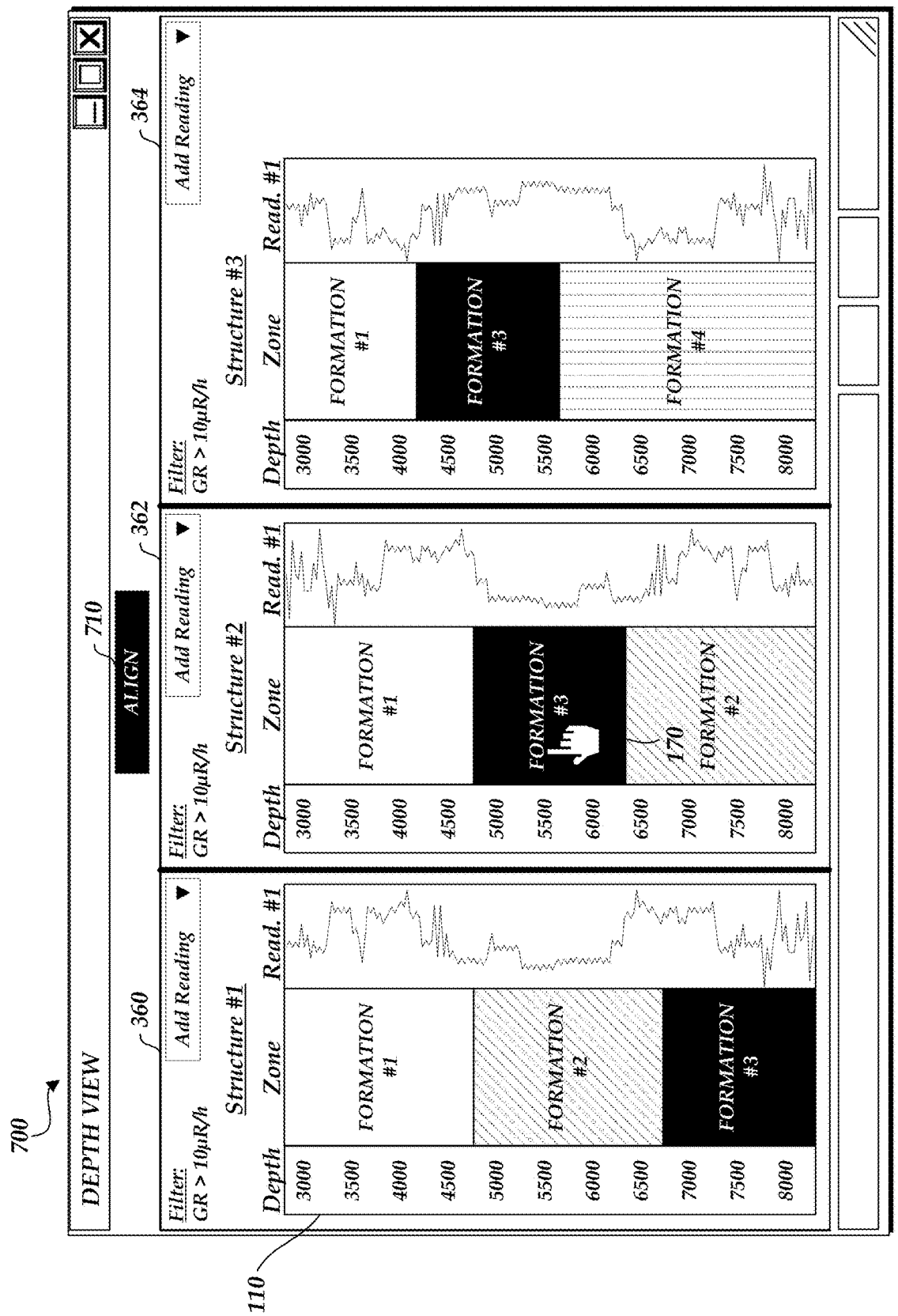
Figure 7C:
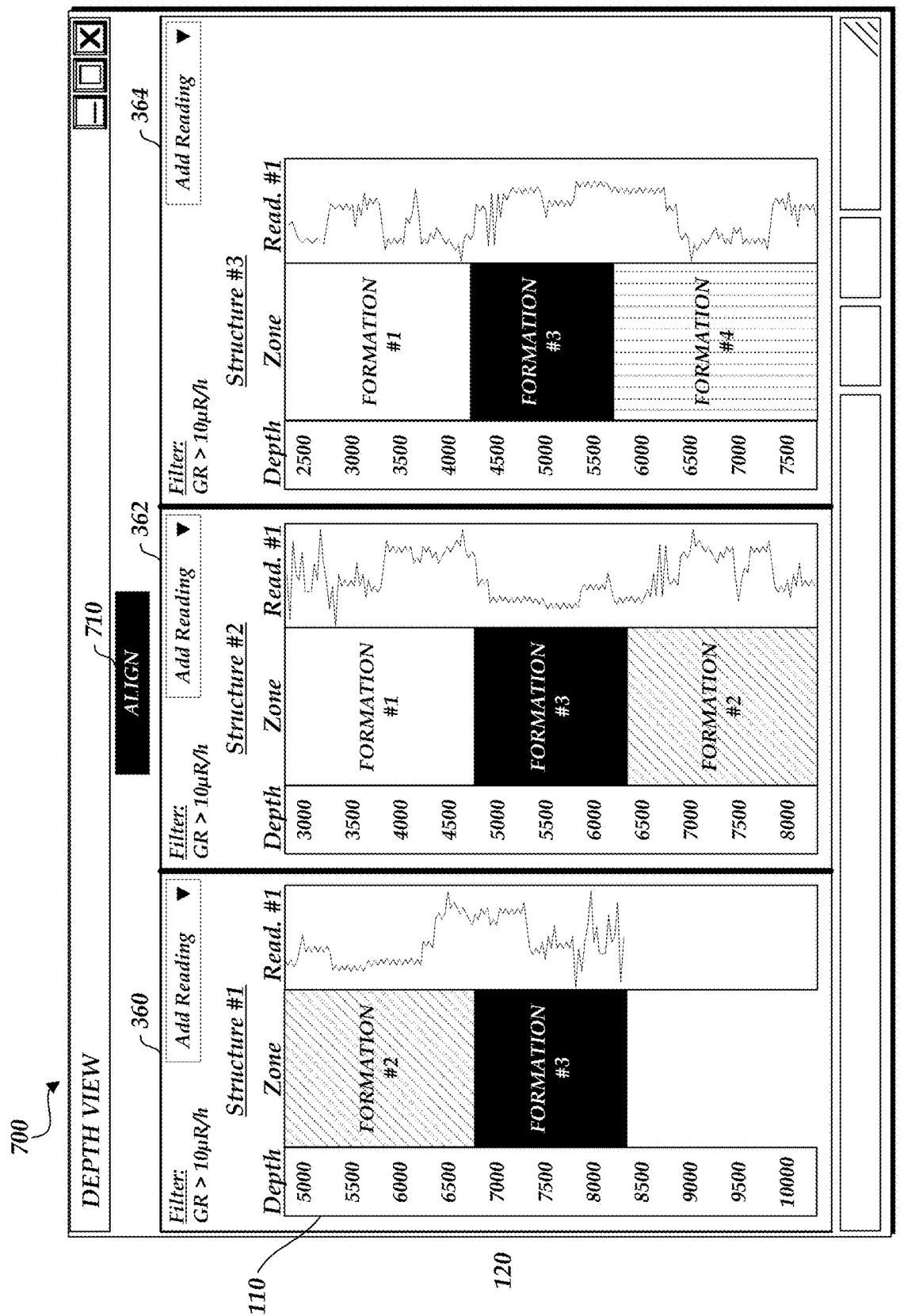

FIGS. 7A-7C illustrate another user interface 700 that displays the alignment of depth graphs. As illustrated in FIG. 7A, the user interface 700 may include an align button 710. Selection of the align button 710 using the cursor 170 may allow the user to align a selected geological layer in the same horizontal plane across one or more of the windows 360, 362, and/or 364.

For example, after the align button 710 is selected using the cursor 170, the geological layer "formation #3" may be selected using the cursor 170, as illustrated in FIG. 7B. Selection of the geological layer "formation #3" may cause the user interface 700 to align the geological layer "formation #3" in the windows 360, 362, and 364. The sensor readings and the depth level indications in each window 360, 362, and 364 may be adjusted accordingly. If an structure associated with a displayed window is not associated with the selected geological layer, the window associated with the structure may be removed from the user interface 700. In alternate embodiments, not shown, a geological layer may be aligned across the windows 360, 362, and 364 by double-clicking a desired geological layer.

The data used to populate the user interfaces depicted in FIGS. 1A through 7C may be retrieved from one or more databases that each receive data from one or more sources (e.g., sensors, structures, etc.). The one or more databases may be located locally and/or externally to the computing system (e.g., the computing system 1700) that generates the user interface.

In further embodiments, not shown, the user may select a button or link in the geographic map and/or the depth view that causes the generation of a report (e.g., in a PDF format) that provides information on a selected structure. Such information may include the displayed sensor readings, depths levels of the structure, geological layers within or surrounding the structure, one or more other attributes relating to the structure (e.g., physical attributes, production attributes, etc.), historical information regarding these attributes, and/or the like.

In further embodiments, the user may include annotations in the windows 360, 362, and/or 364. For example, an annotation may include text that is associated with the structure (e.g., for an oil well structure, that there is a drilling inconsistency at a certain depth level) associated with the window in which the annotation is placed. The annotation may be specific to a sensor reading, depth level, and/or geological layer. The annotation may be stored in a database such that the annotation is displayed each time the structure is selected in the future.

Overview: Document Search

As described above, a shape or formation, such as a three-dimensional shape or formation, may be rendered and displayed in a user interface based on data present in a plurality of files with different file extensions. One or more of the files in the plurality may include text; however, such text may not be searchable using standard operating system file system search applications. For example, the files may not be searchable because they are in a non-standard and/or proprietary format. The files may also be stored in different databases that are coupled to the same network or share drive. Thus, it may be difficult to identify a desired shape or formation without accessing the databases and individually opening each stored file.

Accordingly, disclosed herein are various systems and methods for accessing one or more databases in substantially real-time in response to input from a user provided in an interactive user interface in order to display a preview of a shape in the interactive user interface. For example, the user can enter a search term. One or more databases may be parsed to identify one or more files that match or closely match the search term. Once a file is identified, the one or more databases may be parsed again to identify one or more files that share the same name as the identified file, but that may have different file extensions. The identified files may be processed to generate a preview of a shape or other formation and the interactive user interface may display the preview. The user interface may be interactive in that the user can manipulate the preview (e.g., by rotating the shape or other formation), select to download the files used to generate the preview, and/or select to view the shape or formation within a geographic map.

The systems and methods described herein may provide several benefits. For example, the systems and methods described herein may improve the user experience by allowing the user to identify a desired shape or formation without having to open specific files until the shape or formation is located. As another example, the systems and methods described herein may reduce the processor load because the user may not be continuously requested and opening complex data files during the search for the desired shape or formation.

Example Process Flow and Search for a Shape in an Interactive User Interface

Figure 8A:
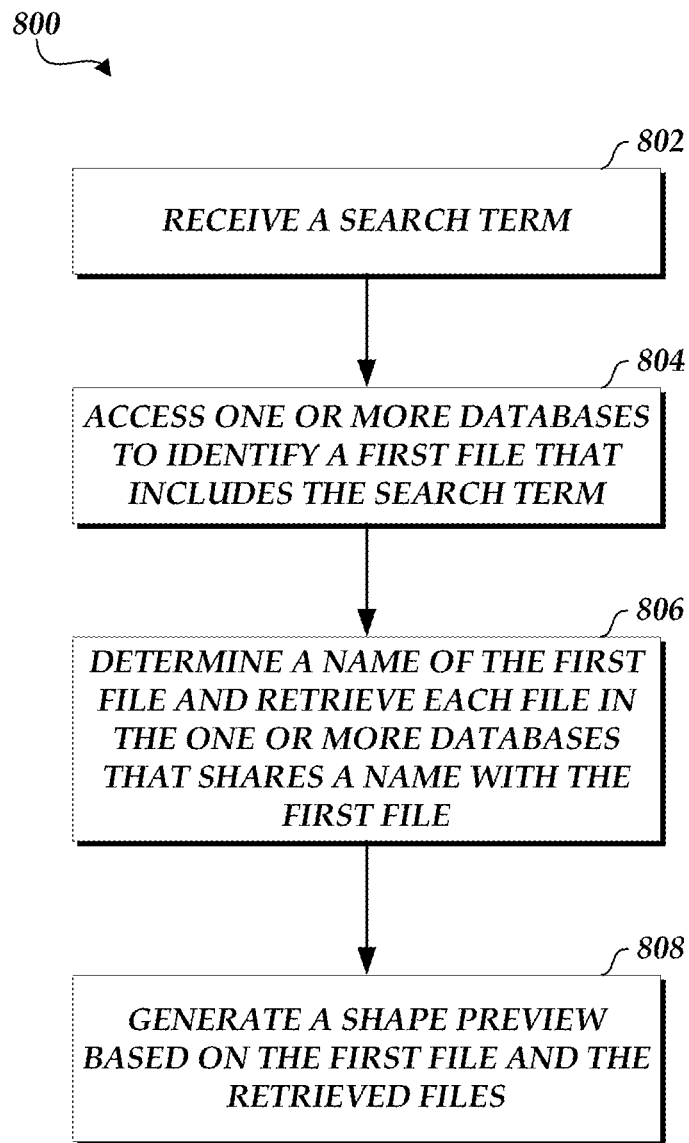
FIG. 8A is a flowchart depicting an illustrative operation of accessing one or more databases in substantially real-time in response to input from a user provided in an interactive user interface in order to display a preview of a shape in the interactive user interface.
Figure 8B:
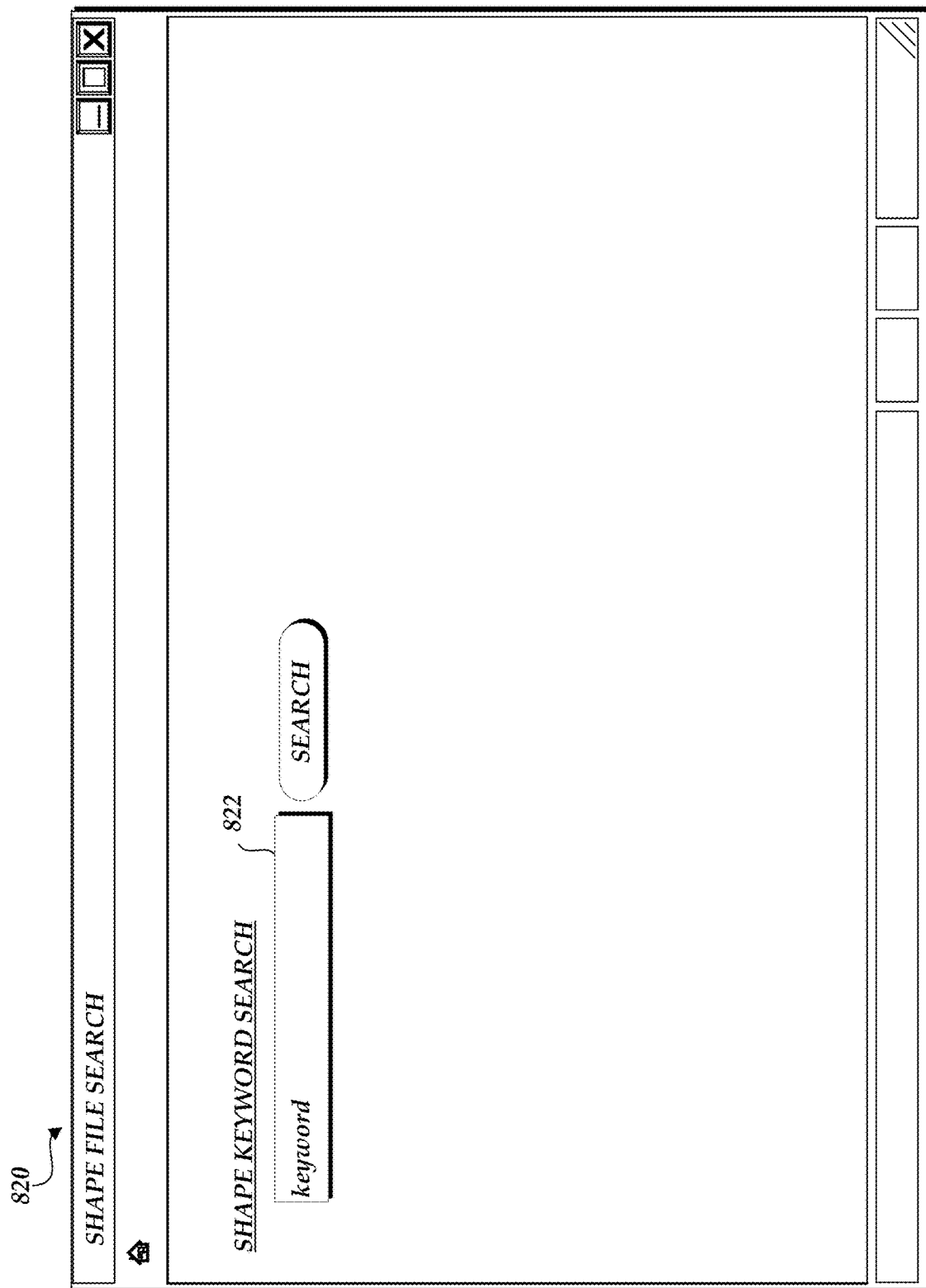
FIGS. 8B-8C illustrate another user interface that displays a preview of a shape.

FIG. 8A is a flowchart 800 depicting an illustrative operation of accessing one or more databases in substantially real-time in response to input from a user provided in an interactive user interface in order to display a preview of a shape in the interactive user interface. The preview may be of a shape or formation, such as a geological layer, a structure such as a mine or an oil well, and/or any other physical or imaginary structure or shape that can be represented geometrically. Depending on the embodiment, the method of FIG. 8A may be performed by various computing devices, such as by the computing system 1700 described below. Depending on the embodiment, the method of FIG. 8A may include fewer and/or additional blocks and the blocks may be performed in an order different than illustrated.

In block 802, a search term is received. For example, as illustrated in user interface 820 of FIG. 8B, a user can enter a search term in field 822. As an example, the user may enter the search term "keyword."

In block 804, one or more databases are accessed to identify a first file that includes the search term. For example, the payload or metadata associated with files of a certain file extension (e.g., .dbf) may be searched in the one or more databases to identify one or more files that include the search term somewhere in the file data.

In block 806, a name of the located file is determined and each file in the one or more databases that shares that name (or at least a relevant portion of the name) with the first file is retrieved. For example, files with different file extensions may otherwise share the same file name. Files with the same file name may include data that can be used to generate a shape or formation. In some embodiments, 5 files with different file extensions share the same name.

Figure 8C:
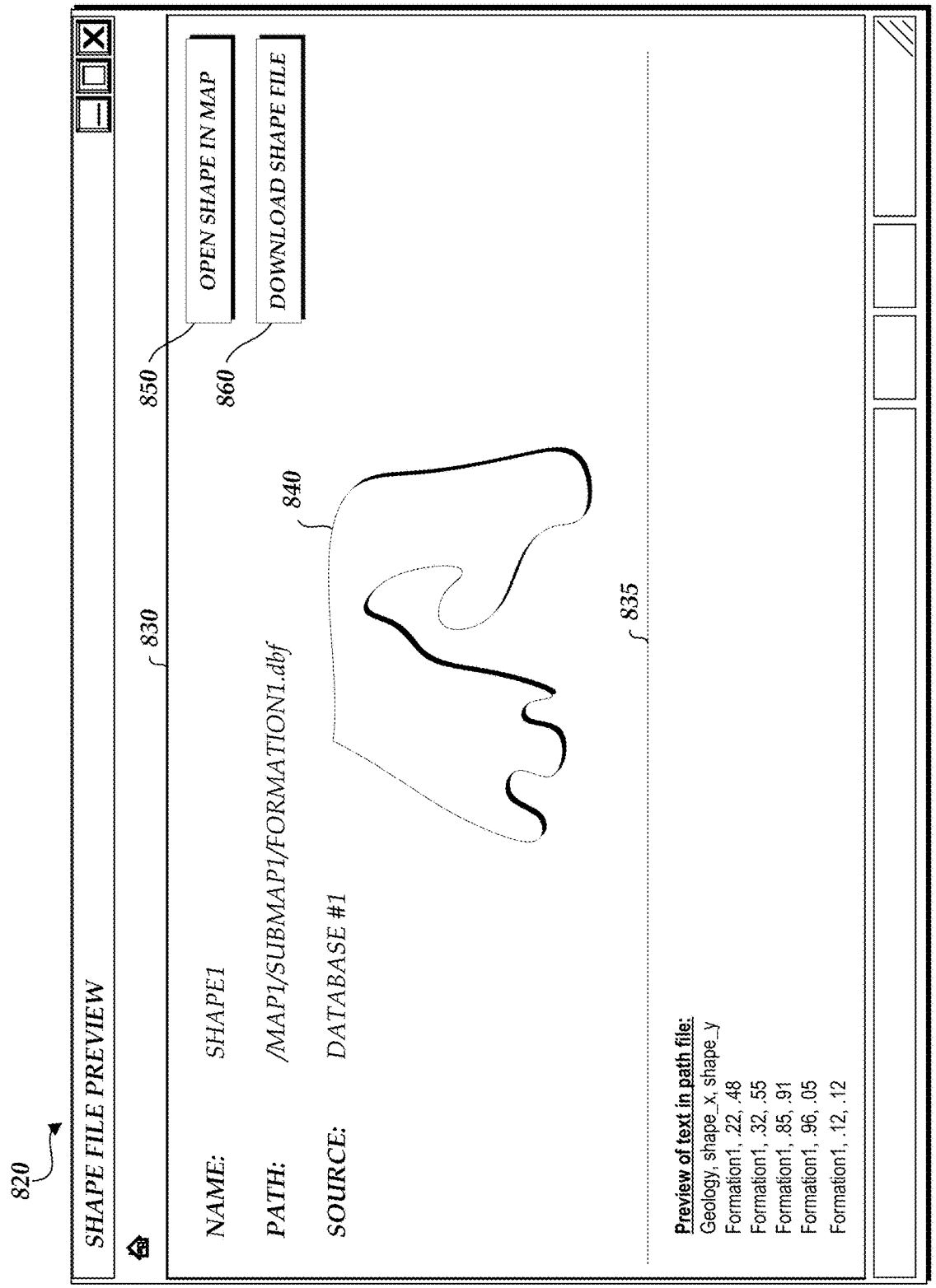

In block 808, a shape preview is generated based on the first file and the retrieved files. For example, a shape preview 840 may be displayed in a window 830 within the user interface 820, as illustrated in FIG. 8C. The user interface 820 may further include a box 835 that previews the text present in the first file (e.g., the file with the .dbf file extension) and/or in the retrieved files (e.g., the other 4 files that share the same name as the first file).

The window 830 may further include information about the shape, such as the name, path, source, etc., and two buttons: an open shape button 850 and a download shape button 860. The open shape button 850 may, when selected by a user using the cursor 170, may open the shape corresponding to the shape preview 840 in a geographic map or other similar graph. The download shape button 860 may, when selected by a user using the cursor 170, zip or otherwise aggregate the first file and the retrieved files (e.g., into a folder) and transmit the zipped or aggregated files to the user's computing device.

Cross Section Paths

It is often desirable to be able to effectively analyze how different values may vary across different locations. For example, it can be useful to view the values of particular attributes along one or more paths, in order to analyze how the attribute value changes over different locations, and to predict attribute values at particular locations. For example, due to the expense of drilling new mines or oil wells, deciding where to drill a new mine or well can be a very important decision. In order to make informed decisions regarding how and where to drill, it is often important to effectively analyze the cross-section composition indicating depth levels of various geological layers or zones at or around potential well locations. For example, it may be beneficial to view cross-section information along one or more paths, in order to analyze the cross-section composition changes over different locations. Although the techniques disclosed herein are described using particular contexts, such as mining or drilling oil wells, it is understood that they may also be applied to other applications, such as geological surveys, market analysis, and/or any application involving data associated with geographic locations. In addition, while the present specification may refer to cross-section information, it is understood that the techniques discloses herein may be applied to other types of attributes having values that vary by location (e.g., precipitation levels, population density, and/or the like).

Figure 9A:
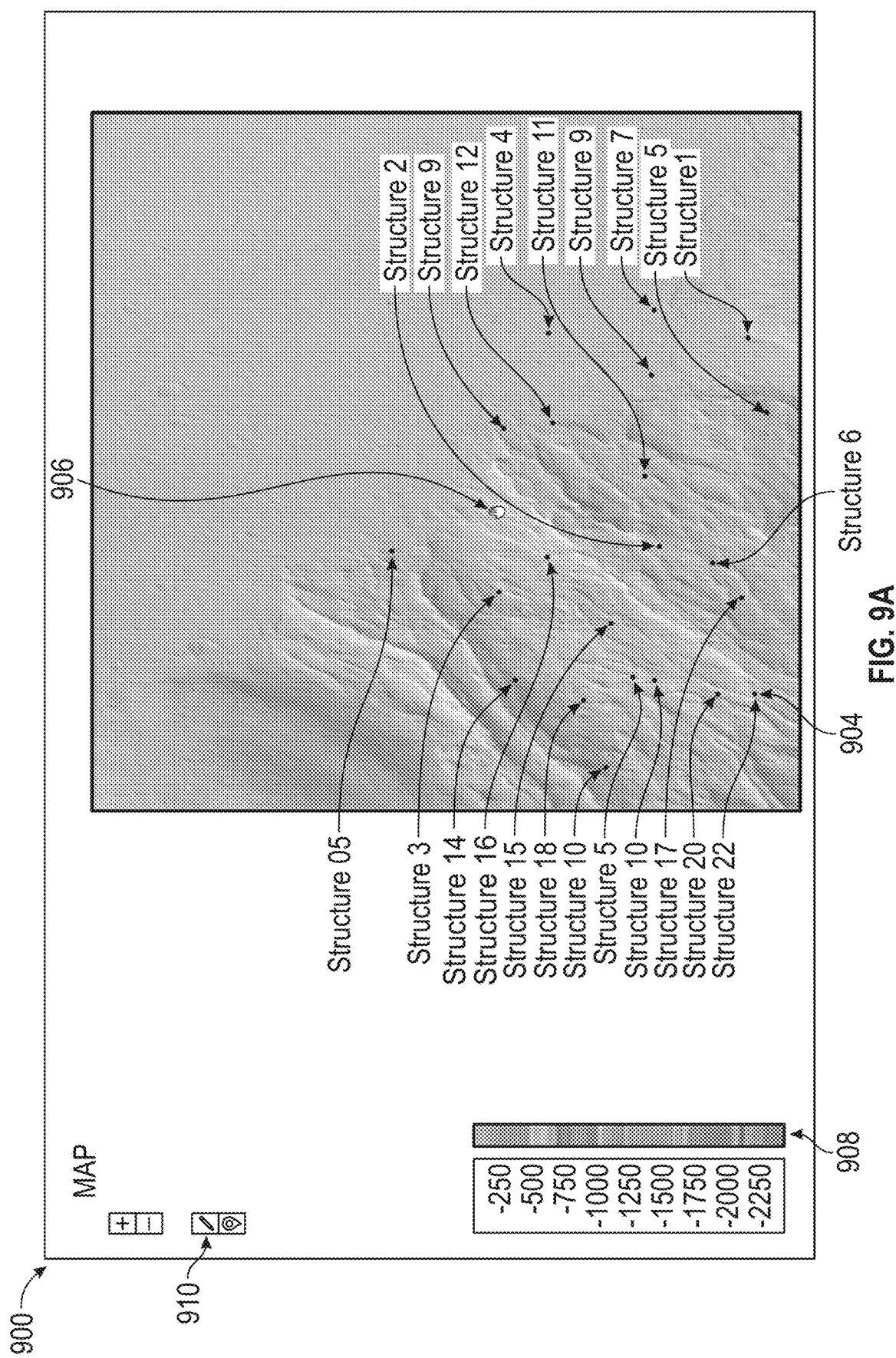
Figure 9C:
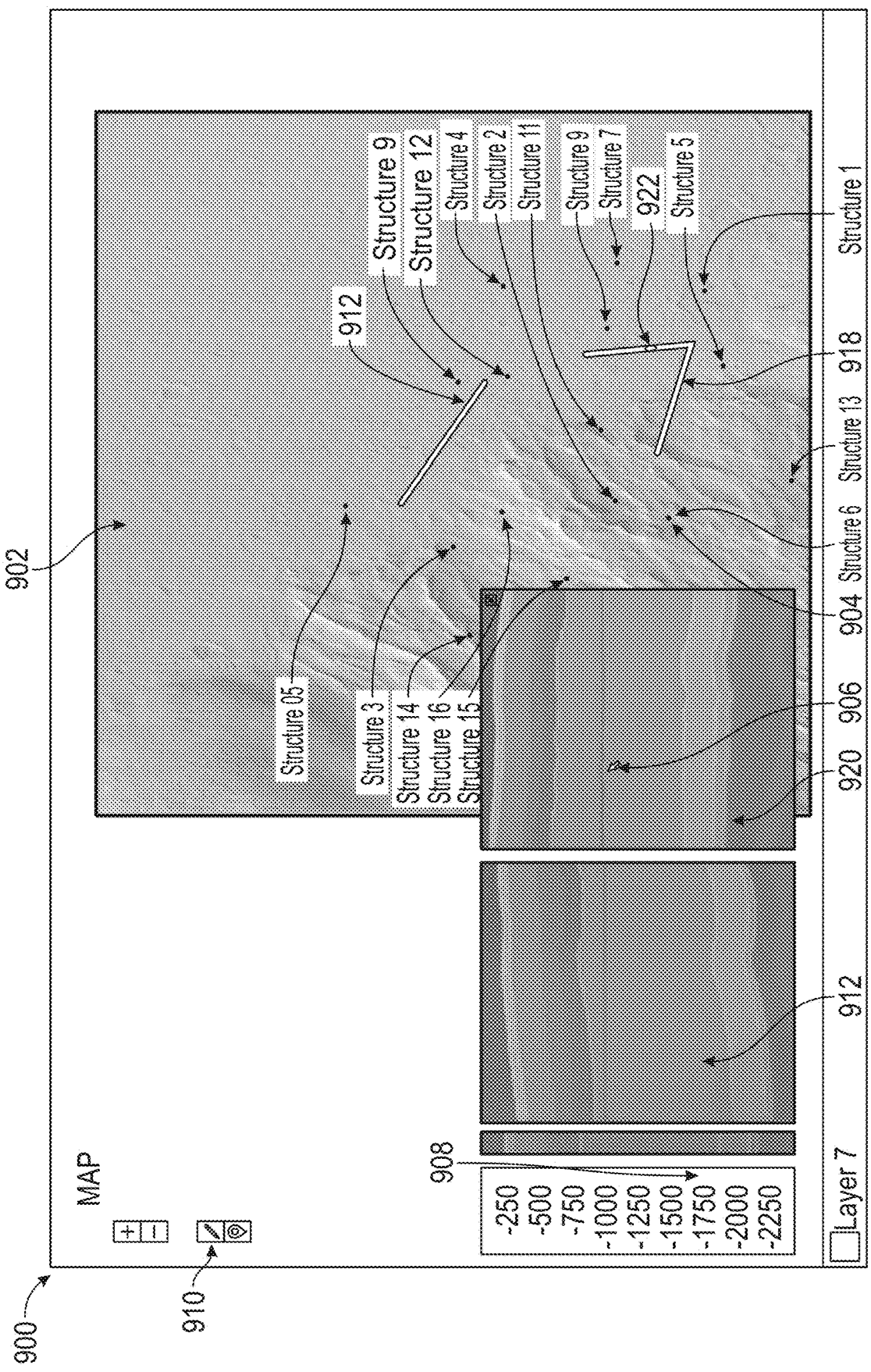

FIGS. 9A-9C illustrate a user interface 900 that displays a location of various structures (e.g. oil wells, mines, or any other types of physical structures) in a geographic area, in accordance with some embodiments. As illustrated in FIG. 9A, user interface 900 includes a geographic map 902 with icons or markers 904 that represent the locations of objects. Attributes or properties to be analyzed, such as the depth levels of various geological layers or zones (hereinafter also referred to as "cross-section layer data"), may vary depending upon a location on map 902. In some embodiments, a three-dimensional layer model (also referred to as a "layer cake model" or a "layer model") may be used to model the cross-section layer data associated with the geographic region corresponding to map 902. The layer model may be based upon seismic surveys, drilling data, such as from existing wells, satellite imagery, data from other types of sensors, prediction models, and/or the like. When a user places a cursor 906 over a portion of map 902, a cross-section 908 may be displayed illustrating the various geological layers present at the location of the map indicated by cursor 906. In some embodiments, as the user moves cursor 906 over different parts of map 902, cross-section 908 may be updated to reflect the layers at the current location of cursor 906. In some embodiments, cross-section 908 may be updated in response to a detected movement of cursor 906, while in other embodiments, cross-section 908 may be updated only when the user clicks on cursor 906 to specify a location on map 902.

In some applications, it may not be sufficient to view the layer cross-section at single points on the map. Instead, it may be desirable to be able to view cross-section information along a line or path (e.g., to be able view how the thicknesses and/or depths of the layers vary by location). FIG. 9B illustrates user interface 900 being used to view and analyze layer information along a path, in accordance with some embodiments. For example, as illustrated in the figure, a user may draw a path 912 on map 902, indicating a path along which the user wishes to view cross-section layer data. In some embodiments, in order to draw path 912, the user first activates a pen tool (e.g., by clicking on a pen tool button 910 or other interface element) before drawing the path 912 on map 902. For example, the user may click on a first location on map 902 to designate a first endpoint, and then a second location on map 902 to designate a second endpoint, wherein path 912 comprises a line between the first and second endpoints.

Once path 912 has been defined, a cross-section panel 914 is displayed showing cross-section layer data along path 912. In some embodiments, a width of cross-section panel 914 may be based upon a length of path 912, while in other embodiments, cross-section panel 914 may have a predetermined width.

When the user moves cursor 906 over cross-section panel 914, the position of cursor 906 relative to cross-section panel 914 (e.g., a horizontal position and/or a vertical position) may be noted. In some embodiments, in response to the user moving cursor 906 over cross-section panel 914, a marker 916 may be displayed on path 912 indicating a corresponding location on path 912, based upon a horizontal position of cursor 906 relative to cross-section panel 914. For example, the left side of cross-section 914 may correspond with the left side endpoint of path 912, while the right side of cross-section 914 may correspond with the right side endpoint of path 912. If cursor 906 is placed halfway between the left and right sides of cross-section panel 914, marker 916 may be displayed halfway along path 912 (e.g., in the middle of the line that makes up path 912). If the user moves cursor 906 to be 25% the width of cross-section panel 914 away from the left edge of cross-section panel 914, marker 916 may be moved to be 25% of the length of path 912 away from the left side endpoint of path 912. In some embodiments, the left edge of cross-section panel 914 may correspond with the first endpoint of path 912 defined by the user, while the right edge of cross-section panel 914 may correspond with the last endpoint of path 912 defined by the user.

In some embodiments, when the cursor 906 is placed over cross-section panel 914, a layer of the cross-section that the cursor 906 is placed over may be determined. In some embodiments, a layer panel 918 may be displayed, indicating to the user the current layer that cursor 906 is placed over. Layer panel 918 may contain an indication of a color associated with the layer by cross-section panel 914, layer name, and/or other layer data.

In some embodiments, a user may draw multiple paths on map 902. For example, FIG. 9C illustrates user interface 900 wherein the user has drawn multiple paths, in accordance with some embodiments. As illustrated in the figure, in addition to drawing a first path 912, the user has also drawn a second path 918. In some embodiments, a path may comprise more than one line. For example, second path 918 as illustrated in FIG. 9C comprises two lines connected in a "V" shape. In some embodiments, the user may select a plurality of endpoints on map 902 using a pen tool, wherein the path comprises one or more lines connecting the plurality of endpoints. In some embodiments, a path may comprise one or more curved lines.

In response to the user defining a second path 918, a second cross-section panel 920 may be displayed showing cross-section layer data along second path 918. In some embodiments, cross-section panel 920 is displayed as a two dimensional plane even when second path 918 comprises multiple lines and/or curved lines that are not on the same plane. In some embodiments, in response to cursor 906 being placed over second cross-section panel 920, marker 922 may be displayed along second path 918, indicating a location on second 918 corresponding to the relative horizontal position of cursor 906 over second cross-section panel 920. For example, if cursor 906 is located 30% the width of second cross-section panel 920 away from the left edge of second cross-section panel 920, marker 922 may be displayed to be 30% of the length of second path 918 away from a first endpoint (e.g., a left side endpoint) of second path 918.

Figure 10:
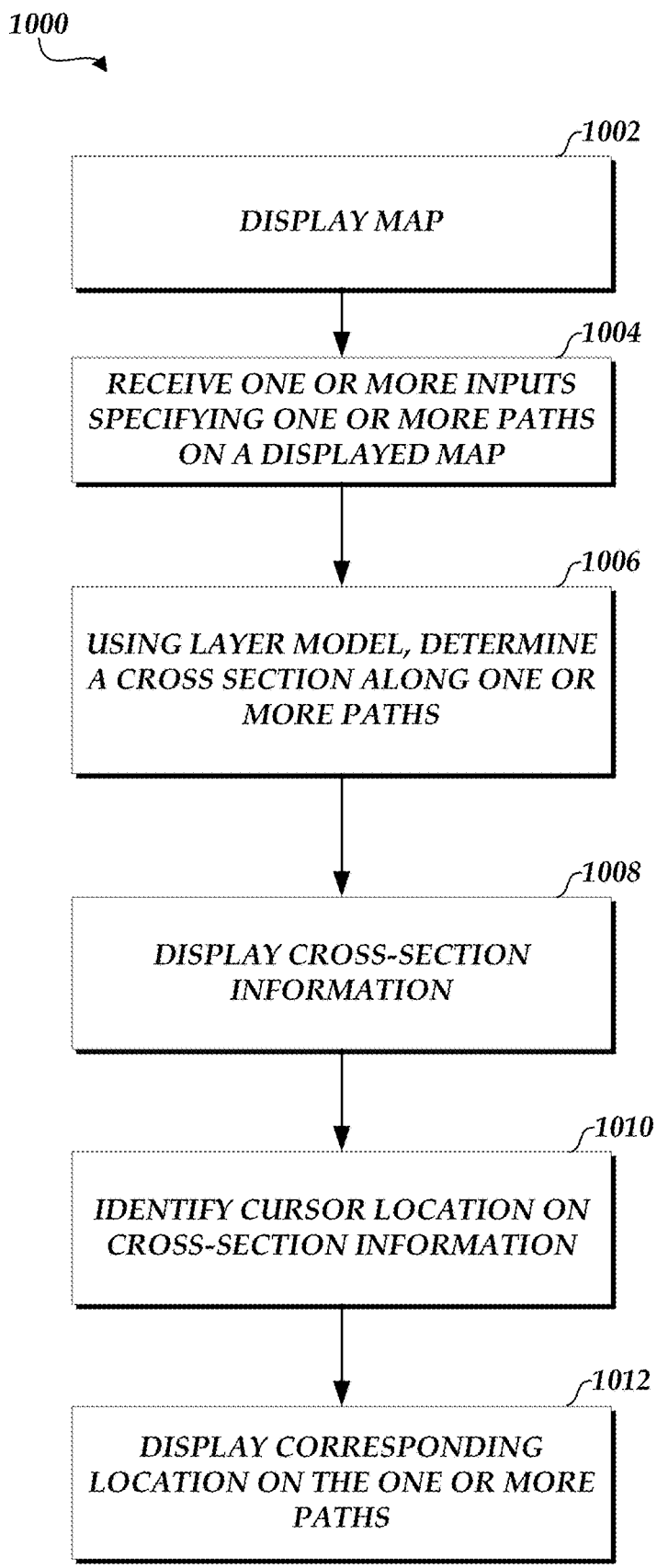
FIG. 10 illustrates a flowchart of a process for displaying cross-section layer data along paths, in accordance with some embodiments.

FIG. 10 is a flowchart of a process for displaying cross-section layer data along paths, in accordance with some embodiments. Depending on the embodiment, the method of FIG. 10 may be performed by various computing devices, such as by the computing system 1700 described below. At block 1002, a map is displayed to a user. The map may correspond to any geographic area that is of interest to the user. In some embodiments, objects having location information that are of interest to the user (such as oil wells) may be displayed on the map.

At block 1004, one or more inputs specifying one or more paths on the displayed map may be received. In some embodiments, the inputs may comprise two or more endpoint locations, wherein the specified path comprises one or more straight lines connecting the endpoints. In some embodiments, the inputs may comprise one or more drawn paths. A path may comprise a straight line, one or more connected straight lines, a curved line, and/or any combination thereof.

At block 1006, a layer model of the map may be accessed and used to determine cross-section layer data along the one or more paths. In some embodiments, the layer model may comprise a 3-D layer cake model that indicates depths for various geological layers or zones at various locations, and may be generated based upon seismic surveys, drilling data, satellite imaging data, data from other types of sensors, prediction models, and/or the like. In some embodiments, cross-section layer data is generated for each path specified by the one or more inputs.

At block 1008, the determined cross-section layer data may be displayed to the user. In some embodiments, the cross-section layer data may be displayed as a panel (e.g., cross-section panel 914 and/or 920, as illustrated in FIGS. 9B and 9C). In some embodiments, a separate cross-section panel may be displayed for each path. In some embodiments, the panel may comprise a two-dimensional plane, even if a path that the cross-section panel corresponds to comprises multiple lines or curved lines that are not all in the same plane.

At block 1010, a location of a cursor on the displayed cross-section layer data may be identified. For example, a user may move a cursor (e.g., a mouse pointer) over a displayed cross-section panel.

At block 1012, a location on the one or more paths corresponding to the identified cursor location may be displayed. For example, a marker may be displayed on a path corresponding to the cross-section panel that the cursor is currently over, wherein the location of the marker along the path corresponds to a horizontal position of the cursor relative to the cross-section panel.

Heatmaps

In some embodiments, heatmaps may be used to view properties or attributes across large areas of a displayed map, and to analyze the distribution of attribute values over a geographic area. In some embodiments, different attributes may be used to generate heatmaps. For example, in the context of geological layers, attributes for which it may be desirable to be able to generate heatmaps may include layer depth and layer thickness. In addition, other attributes, such as rock type, layer hardness, GIIP (gas initially in place) density, permeability, and/or the like, may also be used to generate heatmaps. In some embodiments, certain types of attributes may be associated with specific geographic points on the map instead of being modelled across the entire map.

For example, a particular attribute may be measured at specific locations using one or more sensors, or may correspond to an operation performed at one or more specific locations (e.g., an ROP (rate of penetration) attribute may indicate a rate at which a drill bit was able to penetrate through a particular rock layer, as measured by actual drilling data at particular locations). These types of attributes may be referred to as "metrics." In some embodiments, different attributes may also be combined or aggregated. For example, a first attribute and a second attribute may be combined to form an aggregate attribute, and a heatmap created over the map based upon the aggregate attribute.

Figure 11A:
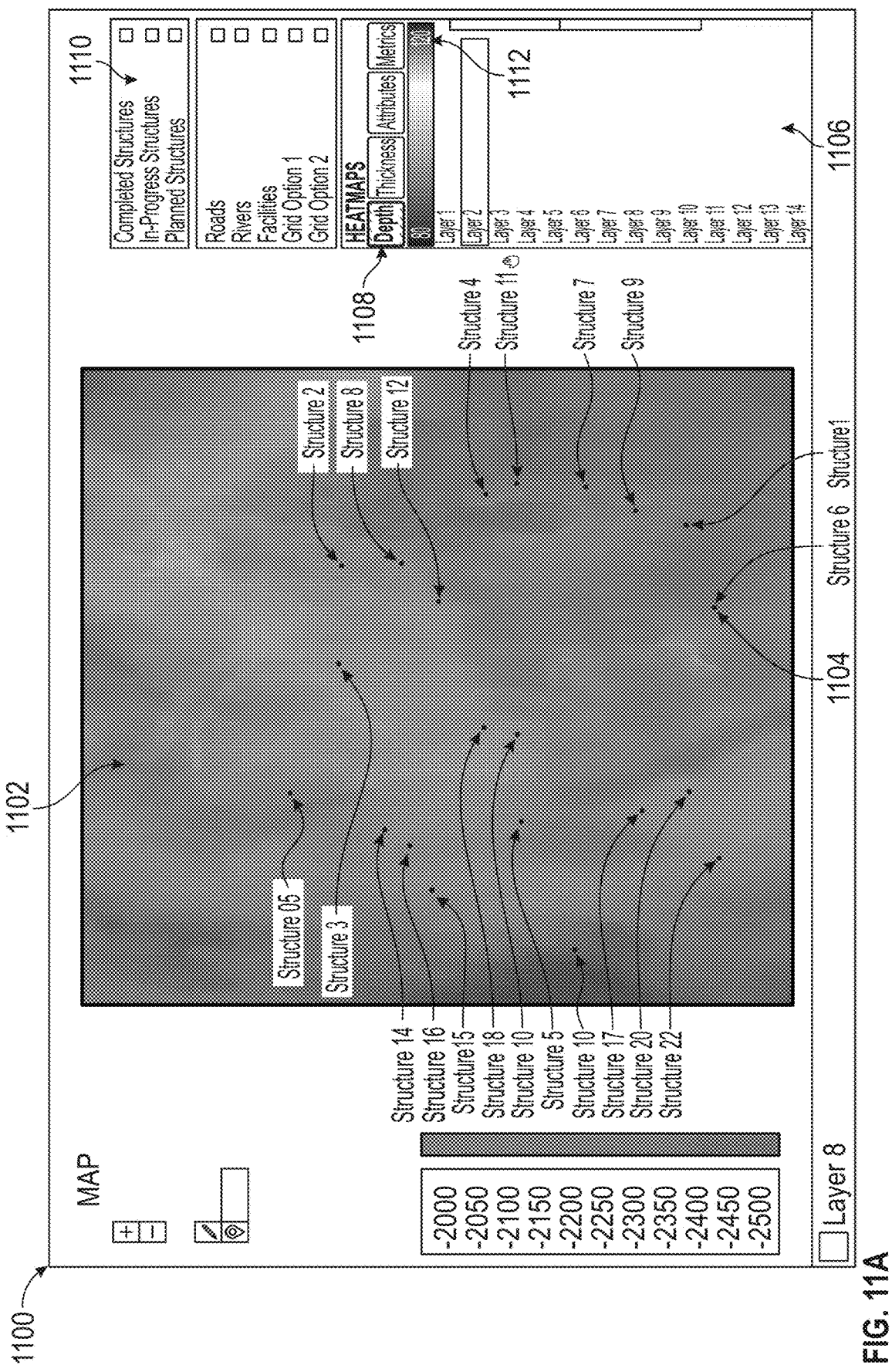
FIGS. 11A-11C illustrate a user interface that may be used to display heatmaps, in accordance with some embodiments.

FIG. 11A illustrates a user interface 1100 that may be used to display heatmaps, in accordance with some embodiments. User interface 1100 may comprise a map 1102, which may contain icons or markers 1104 corresponding to objects of interest (e.g. oil wells, mines, or other physical or geographical structures). In order to select an attribute for which to generate a heatmap, a user may first select a tab of a plurality of tabs 1108 corresponding to attribute categories. For example, available tabs 1108 include "Depth," "Thickness," "Attributes," and "Metrics," In the illustrated embodiment, the user has selected the "Depth" tab. Once an attribute category tab 1108 has been selected, a list 1106 or other type of user interface element may be displayed allowing the user to select a specific attribute to heatmap. For example, under the "Depth" tab, attributes may correspond to particular layers. For example, the user may select a layer from list 1106 to create a heatmap indicating the depth of that layer over the area of map 1102. In some embodiments, the layer depth attribute may correspond to an average depth of the layer, a top depth of the layer, or a bottom depth of the layer.

Once the user has selected a particular attribute, a heatmap corresponding to the selected attribute may be displayed on map 1102. In some embodiments, a three-dimensional layer model is used to determine the value of the selected attribute across the area of map 1102. In some embodiments, the heatmap may be divided into a plurality of sub-units. Each sub-unit may correspond to a pixel, a block, and/or any other type of subset of the heatmap. An attribute value (e.g., depth of the selected layer) may be calculated for each sub-unit of the heatmap, which may then be converted to a color value and displayed to the user.

In some embodiments, a heatmap bar 1112 may be displayed, which indicates to the user the range of depths that the colors of the heatmap signify. For example, in the illustrated embodiment, the minimum depth of the selected layer is 80 m (represented by a first color, such as blue), while the maximum depth is 120 m (represented by a second color, such as red). In some embodiments, the values shown in heatmap bar 1112 may change based upon the specific attribute (e.g., layer) that has been selected.

In some embodiments, additional layers or objects may be displayed on map 1102. A toolbar 1110 may be used to allow the user to select types of additional layers or objects to be displayed. For example, objects such as structures may be displayed on the map or removed from the map using toolbar 1102. In some embodiments, which objects are displayed on the map may be based upon an attribute of the objects, such as structure type, structure status (e.g., operational, non-operational, under construction, and/or the like), etc. In addition, additional layers (e.g., overlays) may be displayed on the map. These may include a road overlay, a rivers or terrain overlay, a facilities overlay, one or more grids, and/or the like.

Figure 11B:
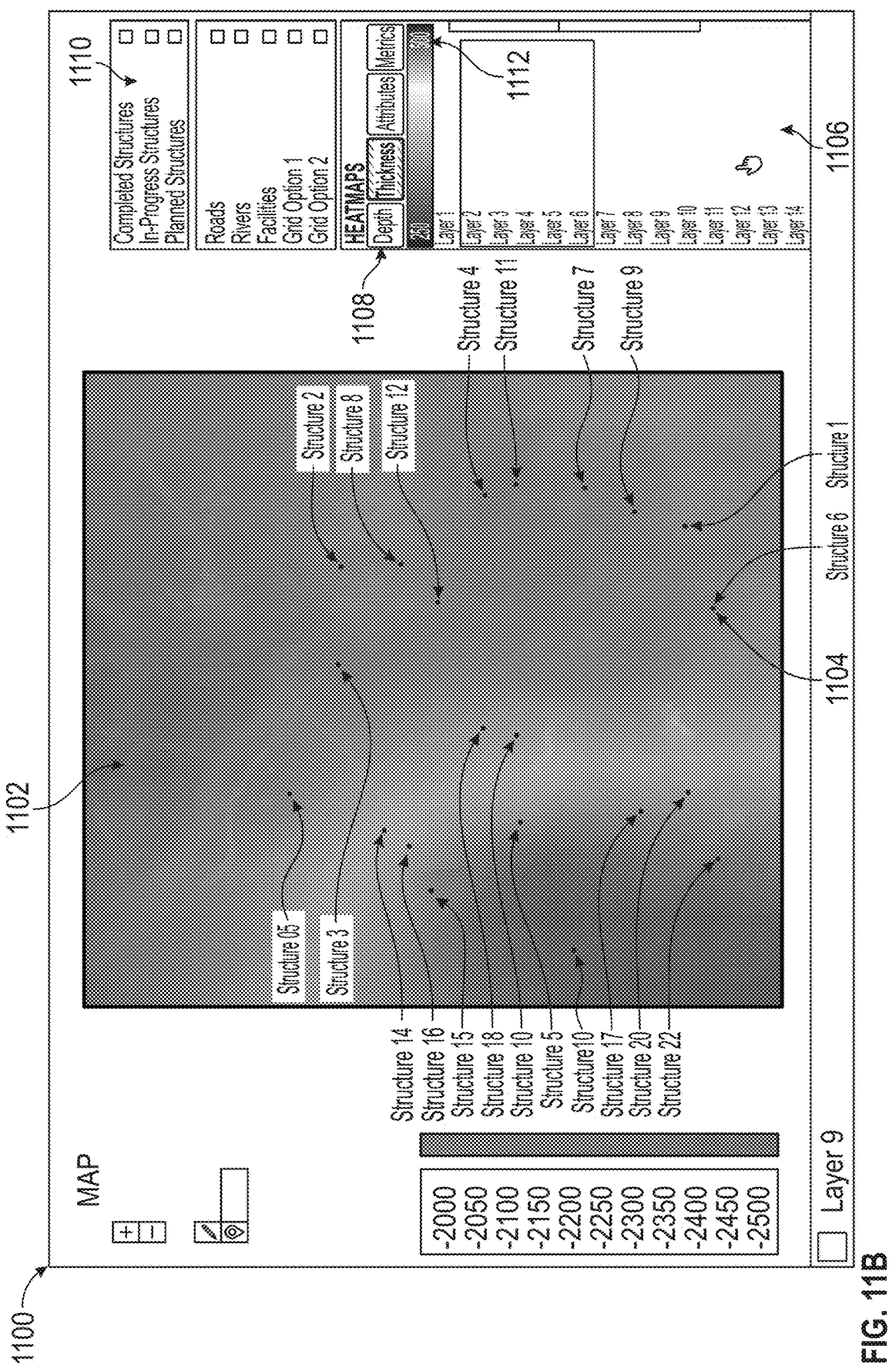

FIG. 11B illustrates the user interface 1100 used to display a heatmap based upon a "thickness" attribute, in accordance with some embodiments. In some embodiments, a user may select multiple attributes within a category when generating a heatmap. For example, the user may select a single layer from list 1106 to generate a heatmap indicating a thickness of the selected layer over the area of map 1102, or may select multiple layers to generate a heatmap that indicates a combined thickness of the selected layers. In some embodiments, restrictions may exist on how multiple attributes may be selected. For example, in some embodiments, with respect to the "thickness" attribute category, only adjacent layers may be selected, while in other embodiments, any layers may be selected.

Figure 11C:
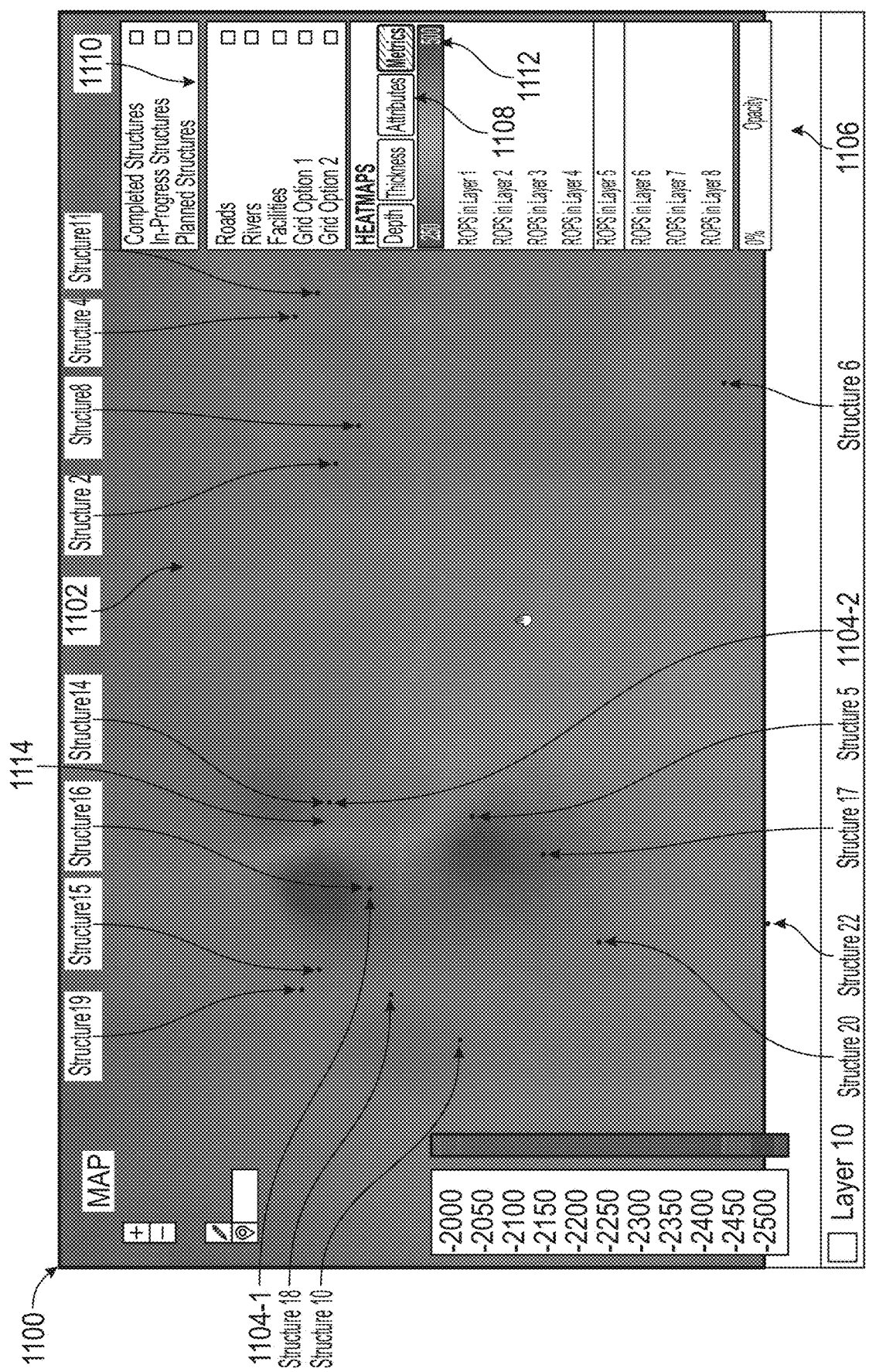

FIG. 11C illustrates user interface 1100 used to generate a heatmap based upon a selected metric, in accordance with some embodiments. As described above, metrics may refer to a type of attribute that are associated with specific geographic points on the map instead of being modeled across the entire map. These geographic points may correspond to objects on the map, such as physical structures (e.g., mines, wells, buildings, and/or the like). For example, in the illustrated embodiment, the user has selected a ROP metric for a specified layer. The ROP value for the layer is measured at specific points in the map (e.g., at specific structures where drilling has been performed in the layer), instead of across the entire map. As such, many locations in map 1102 will not be associated with a ROP value for the specified layer.

In some embodiments, in order to display the heatmap, the metric values are determined for the geographic points on the map for which they are available (e.g., at the locations of particular structures). The metric values may then be converted into color values at those locations and displayed to the user. In some embodiments, predicted attribute values may be calculated for areas of the map that do not correspond to a measured value (e.g., locations on the map that do not correspond to a specific structure). The predicted attribute values may then be converted into colors values at those locations of the map. In some embodiments, the predicted attribute values for a particular location may be based at least in part upon a distance from the location to one or more structures for which metric values are available. In addition, the predicted attribute values may also be based upon the metric values associated with the one or more structures. For example, a location that is close to a structure having a metric value represented by a color (e.g., blue) may be colored substantially the same color, while a location that is further away from the structure may be colored a lighter color due to the greater distance between it and the structure, forming a gradient of heatmap colors. In some embodiments, a steepness of the gradient may be based at least in part upon a metric value associated with one or more nearby structures. For example, the predicted color values near a location having a high metric value may fade at a slower rate with increasing distance, as compared to the predicted color value of locations near a location having a lower metric value.

For example, the heatmap illustrated in FIG. 11C comprises at least a first area of a first color around a first structure 1104-1, and a second area of a second color around a second structure 1104-2. Locations near first structure 1104-1 and second structure 1104-2 are displayed in substantially the same color as the respective structures, which may fade as the distance between the heatmap location and the structure increases. For a location 1114 between first structure 1104-1 and second structure 1104-2, the predicted attribute value may be an intermediate value between the attribute values for first structure 1104-1 and second structure 1104-2, and be based at least in part upon a distance between location 1114 and first structure 1104-1 and a distance between location 1114 and second structure 1104-2. As such, the heatmap color for location 1114 may comprise an intermediate color between the first color and second color, the gradient between the first and second color being indicated on heatmap bar 1112.

Figure 12:
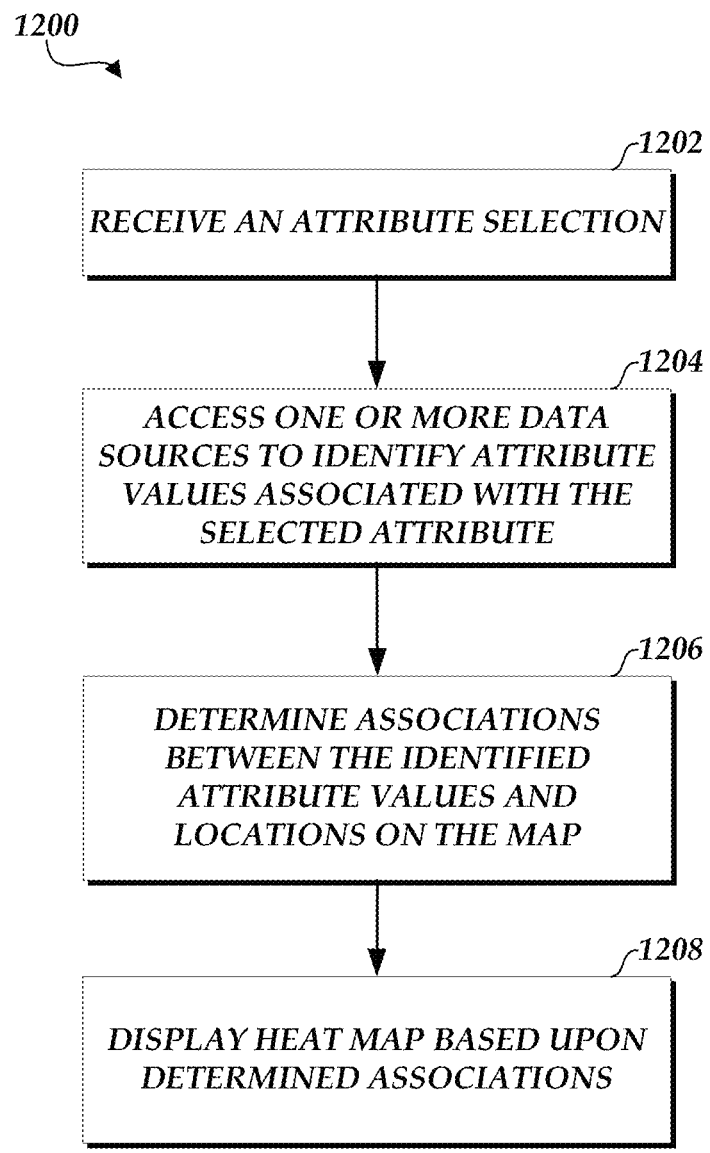
FIG. 12 illustrates a flowchart of a process for generating heatmaps, in accordance with some embodiments.

FIG. 12 illustrates a flowchart of a process for generating heatmaps, in accordance with some embodiments. Depending on the embodiment, the method of FIG. 12 may be performed by various computing devices, such as by the computing system 1700 described below. At block 1202, an attribute selection is received. In some embodiments, this may comprise a user selecting an attribute category, and then selecting an attribute within the selected category. In some embodiments, the selection may comprise multiple attributes that may be aggregated. For example, a user may select a plurality of adjacent layers in a "thickness" category, wherein the aggregate attribute may comprise a sum of the thicknesses of the selected layers. In some embodiments, a selected attribute may comprise a user-defined aggregation or combination of a plurality of other attributes.

At block 1204, one or more data sources may be accessed to identify attribute values that are associated with the selected attribute. For example, in some embodiments a three-dimensional layer model may be used to identify attribute values such as layer depth, layer thickness, and/or the like. In some embodiments, attribute data may be stored in one or more databases (e.g., a relational data store). In some embodiments, attribute data may be associated with particular objects that may be displayed on the map (e.g., oil wells, sensor stations, and/or the like).

At block 1206, associations between the identified attribute values and location on the displayed map are determined. In some embodiments, the associations may be determined using the three-dimensional layer model. In some embodiments, an attribute value may be associated with an object such structure having geographic location data. In some embodiments, the map is divided into a plurality of sub-units (e.g., pixels, blocks, grid spaces, and/or the like). Attribute values associated with each sub-unit of the map may be aggregated into an aggregate value and converted into a color value to be displayed. In some embodiments where attribute values (e.g., metric values) are associated with particular objects or locations on the map, color values for other locations on the map may be associated with a predicted attribute value based at least in part upon a distance between the location and map locations having attribute values.

At block 1208, a heatmap is displayed based upon the determined associations between the attribute values and the map locations.

Depth View Cross-Section

In some embodiments, cross-section paths may be used to analyze the cross-section composition of the terrain between existing well locations. For instance, as illustrated in FIGS. 7A-7C, depth information for a plurality of different structures may be displayed side by side for easy comparison. However, no information is provided regarding the cross-section layer data for locations between the different structures, or how the layers that make up the cross section may change with location between the structures. By using depth view cross-sections, information pertaining to the cross-section composition of geological layers at locations between existing structures locations may be obtained and viewed by the user.

Figure 13A:
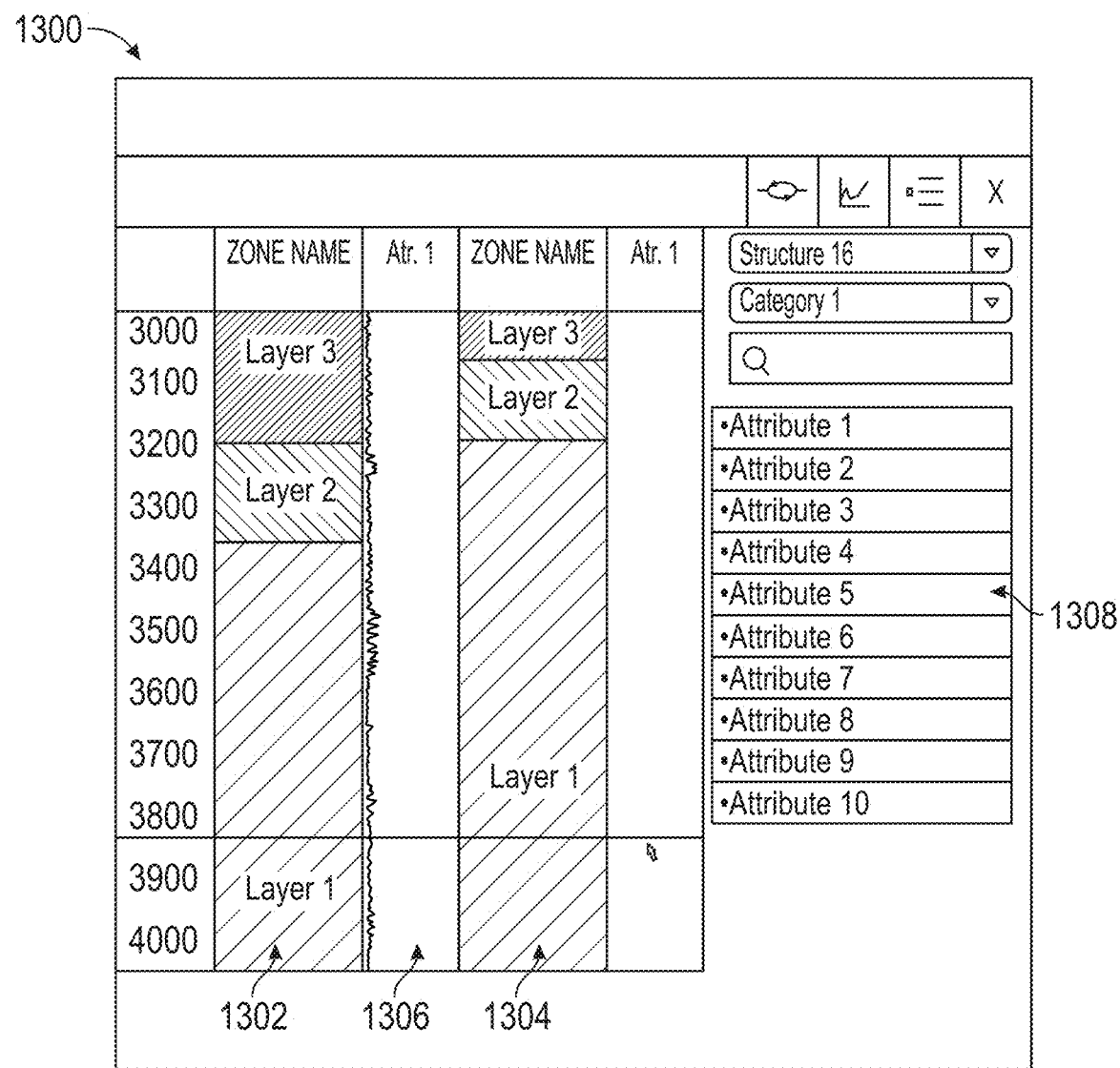
FIGS. 13A-13B illustrate a user interface for displaying depth information and depth view cross-section information, in accordance with some embodiments.

FIG. 13A illustrates a user interface 1300 for displaying well depth information, in accordance with some embodiments. Interface 1300 comprises a first depth graph 1302 corresponding to a first structure, and a second depth graph 1304 corresponding to a second structure. In some embodiments, graphs for additional attributes may also be displayed. For example, an attribute graph 1306 may be used to display values of a selected attribute corresponding to the first structure.

In addition, in some embodiments a user may be able to specify additional attributes for display. For example, a sidebar 1308 may be used to allow a user to select a particular structure (e.g., oil well or mine) for which the user wishes to view additional attributes. The user may then select an attribute category, which may cause a list of attributes within that category to be displayed for selection. In some embodiments, the user may also be able to move the locations of currently displayed graphs. For example, a user may be able to drag and drop attribute graph 1306 to a different location for easier viewing (e.g., to the left of first depth graph 1302, to the right of second depth graph 1304, and/or the like).

Figure 13B:
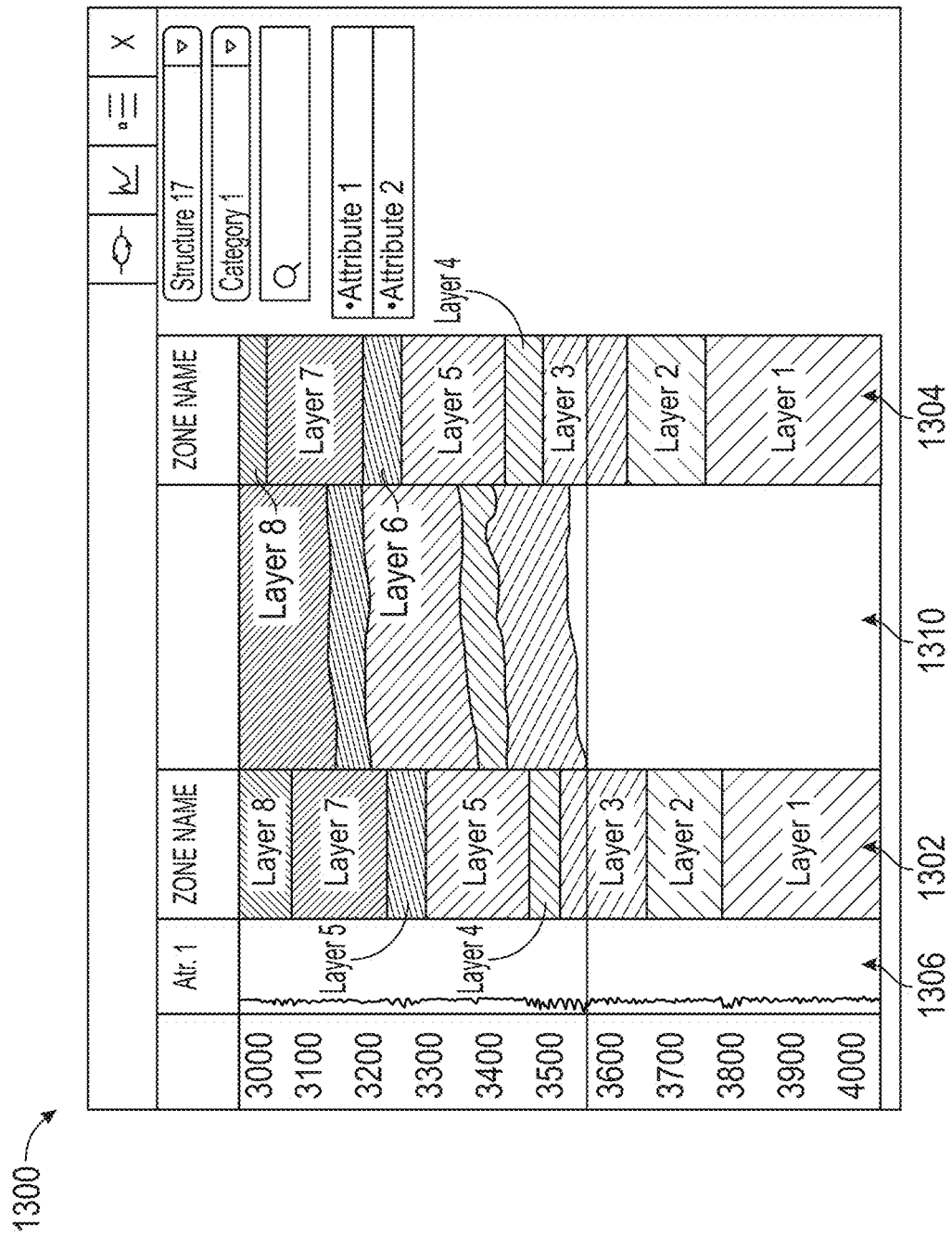

FIG. 13B illustrates user interface 1300 being used to display depth view cross-section data, in accordance with some embodiments. As illustrated in the figure, a cross-section graph 1310 may be displayed between first depth graph 1302 and second depth graph 1304 containing cross-section layer data. In some embodiments, the cross-section layer data displayed in cross-section graph 1310 may comprise the equivalent of a path being drawn on the map between the first well and the second well. As such, the user will be able to view and analyze how the different layers of the well change in depth and thickness between the first well and the second well.

In some embodiments, the depth data used to generate first and second depth graphs 1302 and 1304 may be generated using actual depth measurements during the drilling associated with a particular structure. On the other hand, the cross-section layer data of cross-section graph 1310 may be generated from a model (e.g., a layer cake model). As such, there may sometimes be a mismatch between the data shown in depth graphs 1302 and 1304 and cross-section graph 1310 (e.g., the left edge of cross-section graph 1310 may not match with first depth graph 1302, or the right edge of the cross-section graph 1310 may not match with second depth graph 1304). In some embodiments, this may be simply due to an offset between the axes of the depth graphs and the cross-section graph. In some embodiments, this mismatch may be used to revise or adjust the model used to generate cross-section graph 1310, in order to create a more accurate model.

Event Timelines

Figure 14:
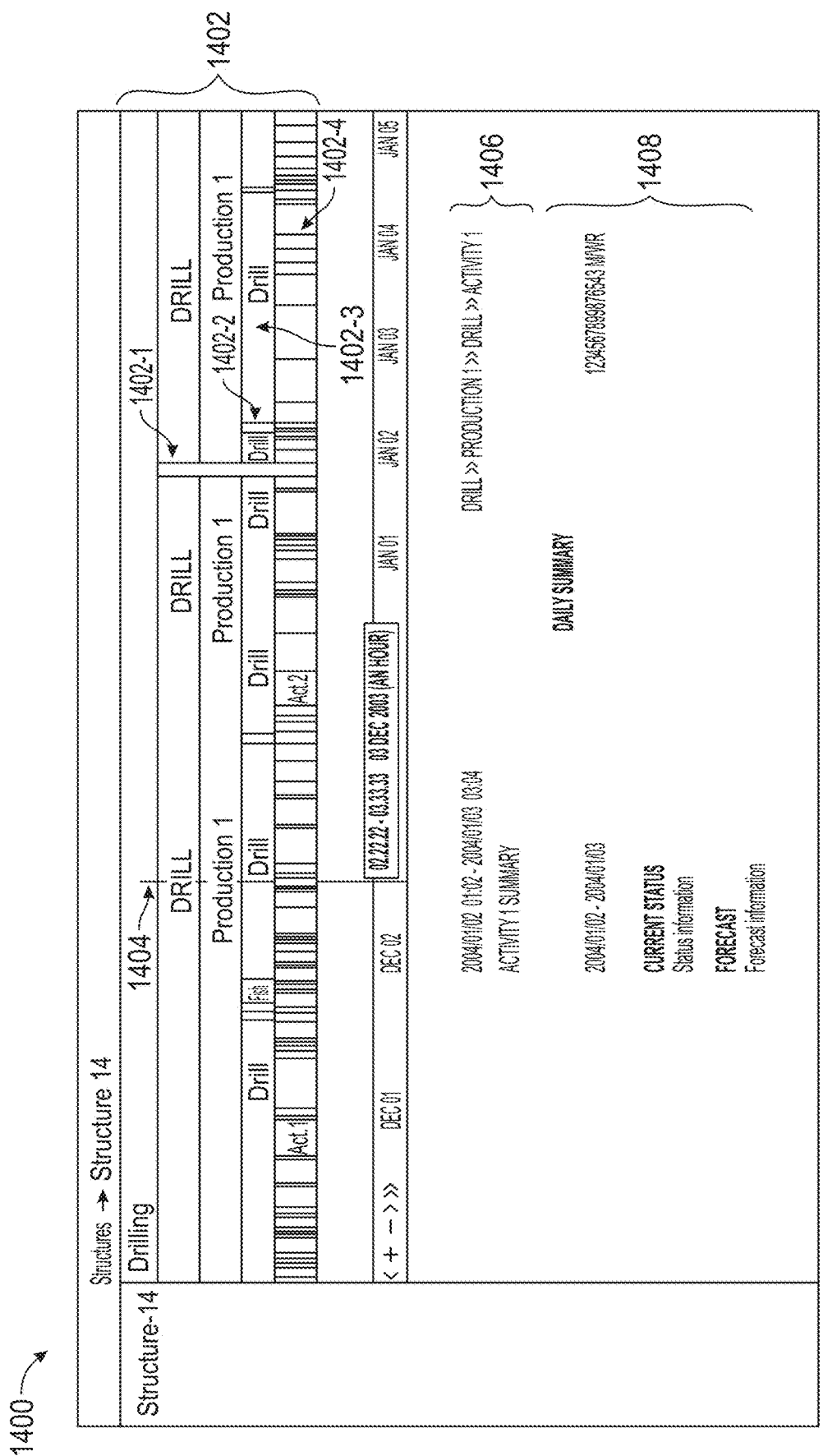
FIG. 14 illustrates a user interface containing an event timeline, in accordance with some embodiments.

Operations performed on a structure may require the performance of a large number of different events and tasks. For example, because of the time and expense associated with drilling structures such as oil wells, it is often important to be able to view and analyze the progress of drilling over time, and the various tasks that are being performed. FIG. 14 illustrates a user interface 1400 containing an event timeline, in accordance with some embodiments. Timeline 1402 may organized into a plurality of different levels or tiers having hierarchical or parent-child relationship. In the illustrated embodiment, timeline 1402 comprises four different levels: events 1402-1, phases 1402-2, tasks 1402-3, and activities 1402-4. Each event may comprise one or more phases. Each phase may in turn comprise one or more tasks. Each task may comprise one or more activities. For example, a drill event (DRILL) may comprise a production phase. A production phase may in turn comprise a plurality of different tasks, such as drill tasks, fish tasks (corresponding to a task where an object has been dropped down a drill hole and must be fished out), and evaluation tasks. Each task (e.g. a drill task) may comprise a plurality of different activities, which may include RIH (run in hole) activities, POOH (pull out of hole) activities, rig service activities, and/or the like.

In some embodiments, a user may select a particular time on timeline 1402 (e.g., at time 1404). In response to the user selection, information pertaining to the events/phases/tasks/activities occurring at the selected time may be displayed at display area 1406. For example, in the illustrated embodiment, time 1404 on timeline 1402 corresponds to a particular activity ("Activity 1") of a drill event of a production phase of an onshore drill event. Display area 1406 may contain information pertaining to the activity at the selected time. The information may comprise one or more attributes corresponding to the activity, such as a status of equipment (e.g., a motor assembly) used in the activity, a speed of the activity, a hole condition at the time of the activity, and/or the like. In some embodiments, the attributes shown in the information may be based upon a type of activity associated with the selected time. In addition, display area 1406 may display a time range corresponding to the activity (e.g., a start time and an end time), as well as a breadcrumb trail indicating a hierarchy of levels associated with the selected time.

In some embodiments, the user may be able to select a specific level (e.g., the task level) when selecting a time 1404 in timeline 1402. For example, instead of displaying information corresponding to the RIH activity at the selected time, display area 1406 may instead display information associated with a higher level associated with the selected time (e.g., a drill task, production phase, or drill event). In some embodiments, the displayed information may comprise an aggregation of attributes associated with lower levels (e.g., information displayed for a drill task may comprise aggregated attributes of one or more activities associated with the drill task).

In some embodiments, a second display area 1408 may be used to display information for a particular time period associated with the selected time 1404 (e.g. the day corresponding to the selected time 1404). For example, the information may comprise a current status of the well, a forecast for the well, and/or the like. In some embodiments, the information may comprise aggregated attributes of activities/tasks/phases/events that took place during the time period.

Path Trajectories

In some embodiments, it may not only be important to be able to analyze the progress of events occurring over time, but also how these events are associated with different locations. Understanding where events are occurring may be just as important as knowing when they are occurring. For example, in the context of drilling, certain events may be correlated with certain drill depths, drill trajectories, or the suspected interface between different geological layers. By viewing where these events occur on the path or trajectory, these correlations may be identified.

Figure 15A:
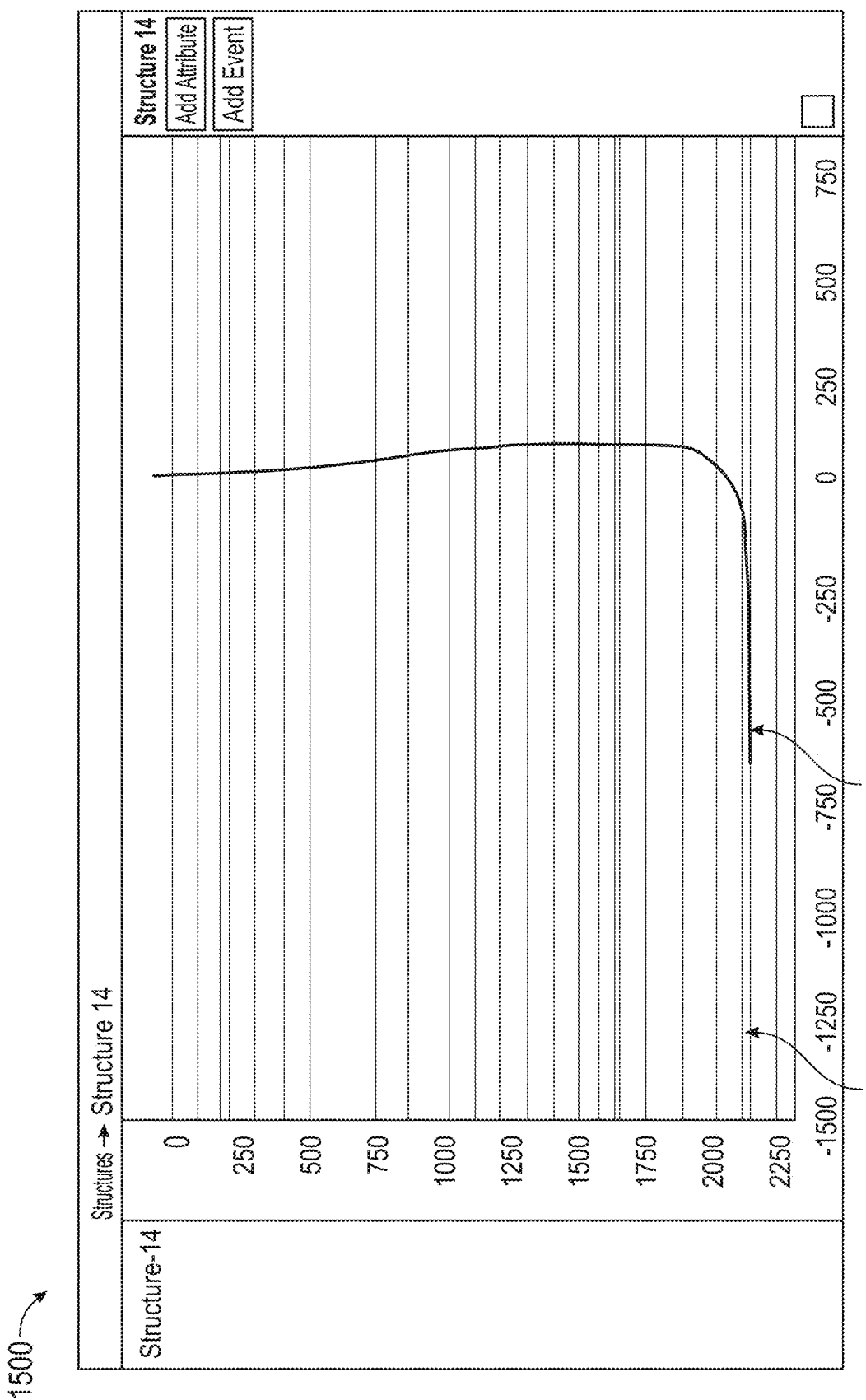
FIGS. 15A-15C illustrate a projection of a path or trajectory, in accordance with some embodiments.

FIG. 15A illustrates user interface 1500 displaying a projection of a drill path or trajectory (hereinafter referred to collectively as a path), in accordance with some embodiments. A path may correspond to any type of path or trajectory in physical space. For example, the path may correspond to a path taken by a drill when drilling a well. In some embodiments, a path is projected onto a two-dimensional plane (represented by graph 1502) to form a path projection 1504. In other embodiments, instead of projecting the path onto a two-dimensional plane, the path may be represented by a three-dimensional model.

Figure 15B:
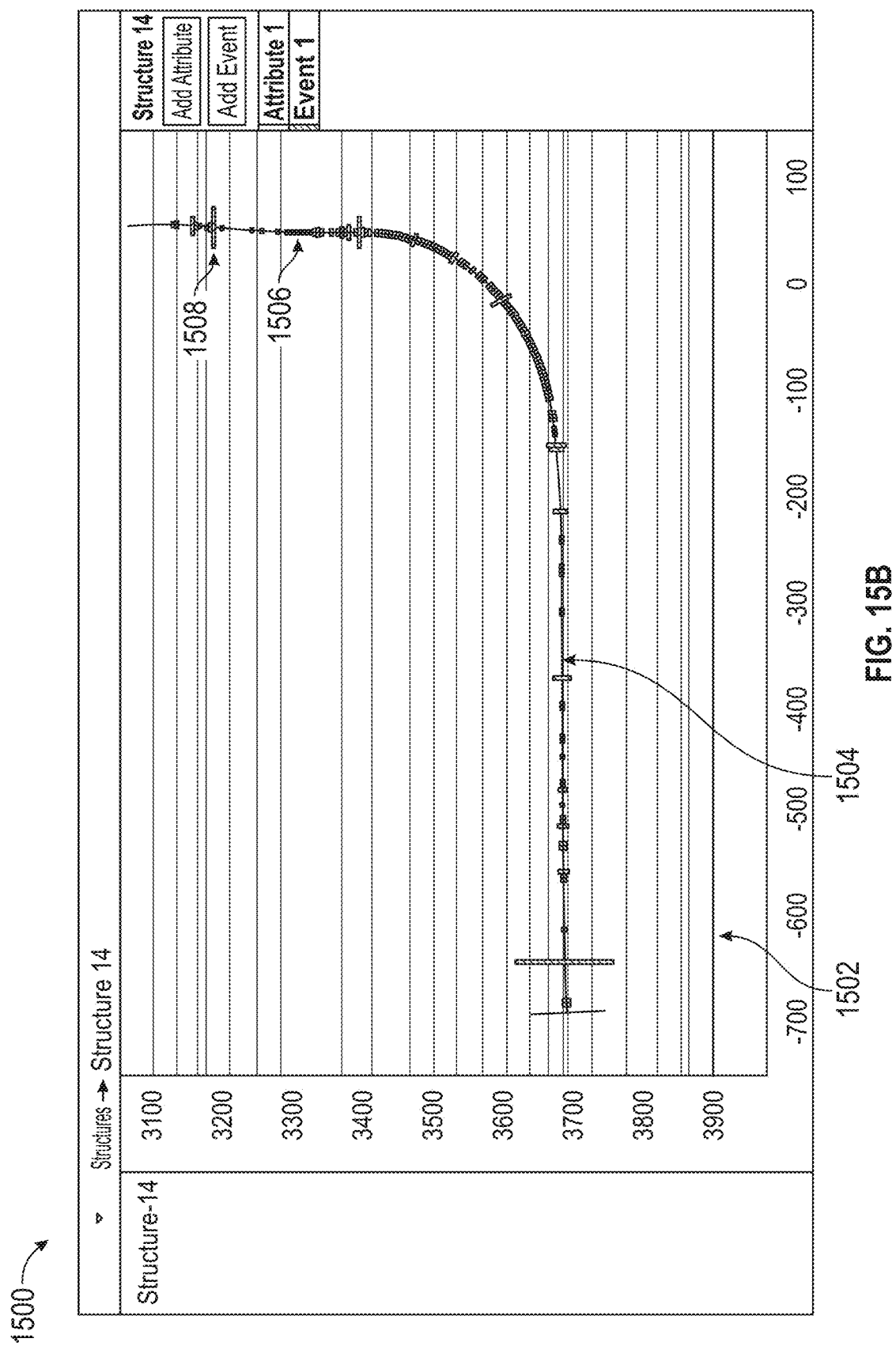

FIG. 15B illustrates events and/or attributes displayed on a path, in accordance with some embodiments. Path projection 1504 in graph 1502 may be overlaid with attribute data 1506 and/or event data 1508. The attribute data 1506 may corresponds to measurements taken at different locations along the path. For example, to measure a GR (gamma radiation) attribute, which measures a level of gamma radiation at different locations along the path, gamma radiation sensors may be installed along different locations of the path, or a gamma radiation sensor may be moved along the path, in order to measure gamma radiation levels various locations along the path. Event data 1508 corresponds to an event type that may be associated with different locations along the path (e.g., NPT (non-productive time) events, indicating an amount of non-productive time that occurred during the drilling of the well). For example, events (such as NPT events) may be recorded as they occur. In addition to recording the time of the event, a location associated with the event may also be recorded and associated with the event. In some embodiments, a toolbar 1510 may be used by the user to specify the attributes and/or events to be overlaid on path projection 1504. In some embodiments, any combination of different attributes and/or events may be selected.

As such, in some embodiments, attribute values and/or events may be associated with particular locations along the path (e.g., an attribute value may be associated with a location where it was measured, while an event may be associated with a location where it occurred). Locations along the three-dimensional model of the path may be mapped to locations on the two-dimensional projection of the path. Thus, each attribute value and/or event may be associated a particular location on the two-dimensional path projection.

In some embodiments, the attribute and/or event data may be displayed as one or more bars extending from various locations along path projection 1504, wherein a length of a bar at a given location on the path projection indicates a particular magnitude or measure of the attribute or event corresponding to the location. For example, the bars that comprise attribute data 1506 may indicate an amount of gamma radiation that is measured at various locations along path projection 1504. Similarly, the bars that comprise event data 1508 may indicate how many hours of non-productive time occurred at particular locations of the path projection 1504. In some embodiments, an event type may be associated with a plurality of different attributes. In such cases, the length of the bars corresponding to the events may be based upon a particular attribute associated with the event or an aggregation of one or more particular attributes associated with the event. For example, for NPT events, the length of a bar at a particular location along the path projection may indicate a length of time associated with NPT events at that location. In some embodiments, a bar at a particular location of the path may be displayed such that it is substantially perpendicular to a tangent of the path at the particular location.

In some embodiments, bars associated with different attributes and/or event types may be overlaid on top of each other. The bars associated with different attributes and/or event types may be rendered with different colors or shadings for visual clarity. In some embodiments, in order to improve visibility for bars associated with a particular attribute and/or event type, the user may be able to change the order in which the bars associated with different event types and/or attributes are overlaid. For example, in some embodiments the user may select an event or attribute at toolbar 1510 in order to display the bars corresponding to the selected attribute or event type may be displayed in front.

Figure 15C:
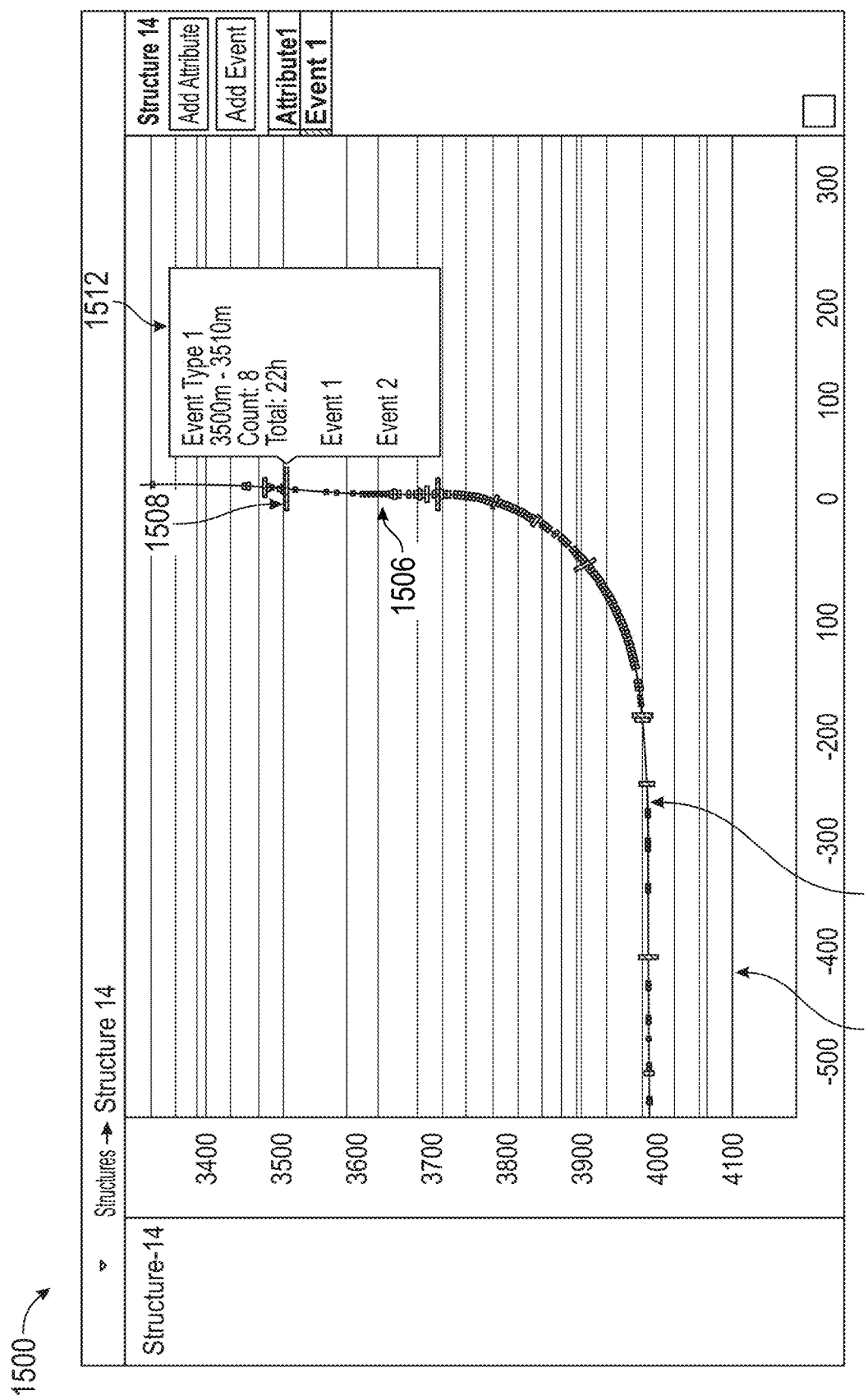

FIG. 15C illustrates events and/or attributes displayed on a path, in accordance with some embodiments. In some embodiments, a user may select a bar associated with attribute data 1506 or event data 1508 (e.g., by hovering the cursor over a particular bar, or clicking on the particular bar). In response to the selection, a pop-up 1512 or other interface element may be displayed that indicates a measurement or value of the attribute or event associated with the selected bar. For example, for bars corresponding to attribute data, the value of the attribute (e.g., gamma radiation measurement) for the selected bar may be displayed in response to a selection of the bar. In some embodiments, for bars corresponding to event data, additional event data may also be displayed. For example, the length of a bar corresponding to NPT event data may be based upon a length of time associated with the NPT event. However, pop-up 1512 may display, in addition to the length of time value associated with the NPT event, other attributes and information associated with the NPT event. In some embodiments, pop-up 1512, in addition to attribute or event data, may also display data pertaining to the location on the path projection 1502 of the selected bar (e.g., depth information, coordinate information, and/or the like).

In some embodiments, a particular bar may correspond to multiple events. For example, multiple NPT events may have occurred at a particular location in the path. In some embodiments, when a user selects a particular bar associated with NPT events, pop-up 1512 may indicate the one or more NPT events that are the particular bar at the particular location of the path projection 1504. In some embodiments, attribute values (e.g., length of time and/or other attributes) may be displayed separately for each event. In addition, aggregate information for the events associated with the bar (e.g., number of events associated with the selected bar, aggregated attribute values such as total length of time, and/or the like) may also be displayed.

By being able to view attribute data and event data as it relates to different locations, correlations between different attributes, events, and/or path shape may be more easily identified. For example, by examining NPT events with respect to the path projection, correlations may potentially be identified between where non-productive time occurred and changes in the direction or curvature of the path, the depth of the path, and/or various attribute values such as gamma radiation. For instance, it may be found that a large amount of non-productive time occurs near a location where the path changes direction, or where there is a high amount of gamma radiation.

Figure 16:
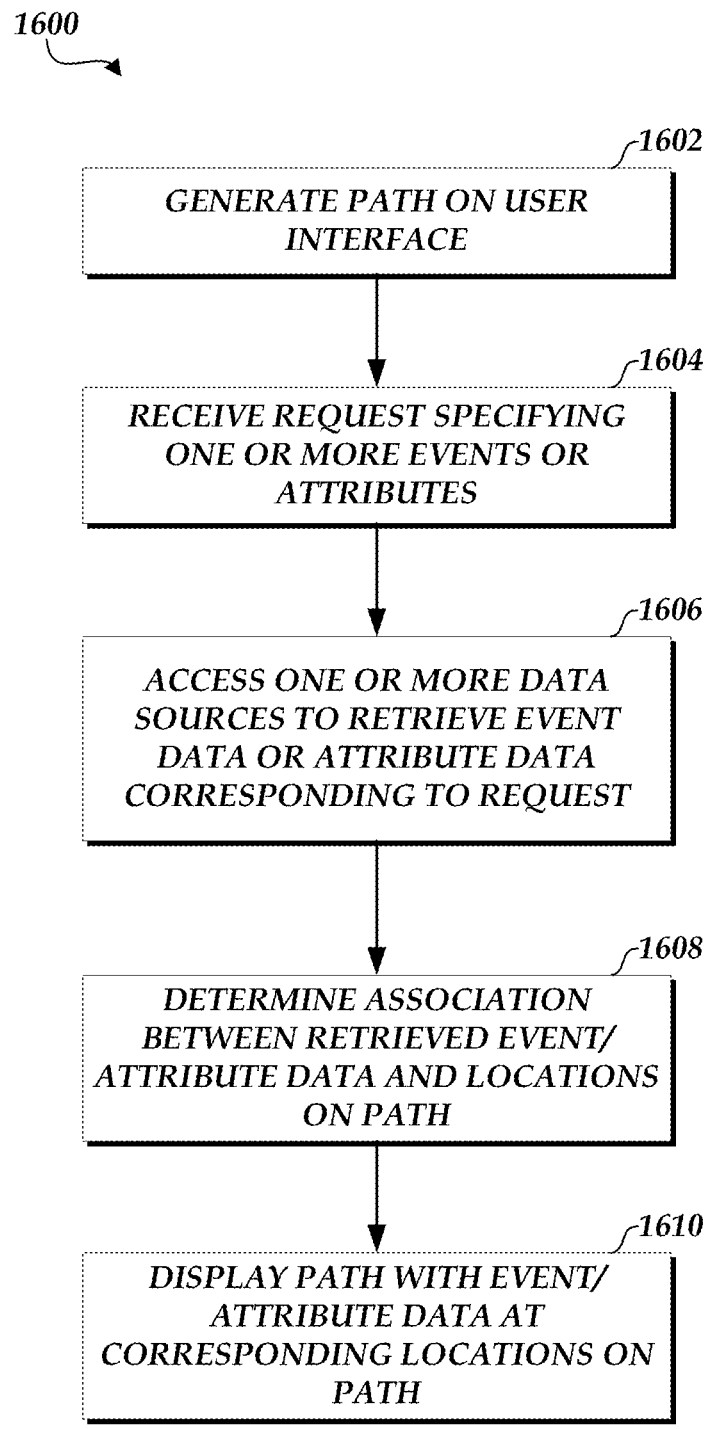
FIG. 16 illustrates a flowchart of a process for displaying attribute and/or event data in conjunction with a path or path projection, in accordance with some embodiments.

FIG. 16 illustrates a flowchart of a process for displaying attribute and/or event data in conjunction with a path or path projection, in accordance with some embodiments. At block 1602, a path (e.g., well path or trajectory) is generated on an interactive user interface. In some embodiments, the path is projected onto a two-dimensional plane. Alternatively, in other embodiments, the path may be modeled as a three-dimensional model. In some embodiments, a user may view a three-dimensional model of the path, and select a desired two-dimensional plane for which to project the path. In some embodiments, when a user is viewing a two-dimensional projection, a three-dimensional model may also be displayed in the user interface, showing the two-dimensional projection plane relative to the three-dimensional model.

At block 1604, a request is received specifying one or more attributes or events. The request may comprise any combination of attributes or events that can be associated with locations on the path. For example, a requested attribute may be associated with data measured by one or more sensors at various locations on the path. At block 1606, one or more data sources are accessed in order to retrieve event and/or attribute data corresponding to the received request.

At block 1608, one or more associations between the retrieved data (event and/or attribute data) and locations on the displayed trajectory are determined. For example, attribute data obtained from a particular sensor at a particular location on the path may be associated with the location. Similarly, event data may be associated with path locations at which the event(s) occurred. In some embodiments, determining the associations between the retrieved data and locations on the displayed trajectory may comprise determining associations between the retrieved data and respective locations on the three-dimensional path, and determining associations between the locations on the three-dimensional path and respective locations on the two-dimensional projection of the path.

At block 1610, the trajectory is displayed with indications of the event and/or attribute data at corresponding locations on the trajectory. For example, in some embodiments, the event and/or attribute data may be displayed as one or more bars located at corresponding locations on the path, wherein a length of the bar corresponds to a value associated with the attribute or event. In some embodiments, each attribute and/or event type may be displayed as a different set of bars on the path that are overlaid on top of each other.

In some embodiments, multiple events associated with the same location on the path may be aggregated into a single bar, wherein a length of the bar corresponds to an aggregated value associated with the events. In some embodiments, a displayed bar may be selected by the user to view the underlying attribute or event data associated with the selected bar.

Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 17:
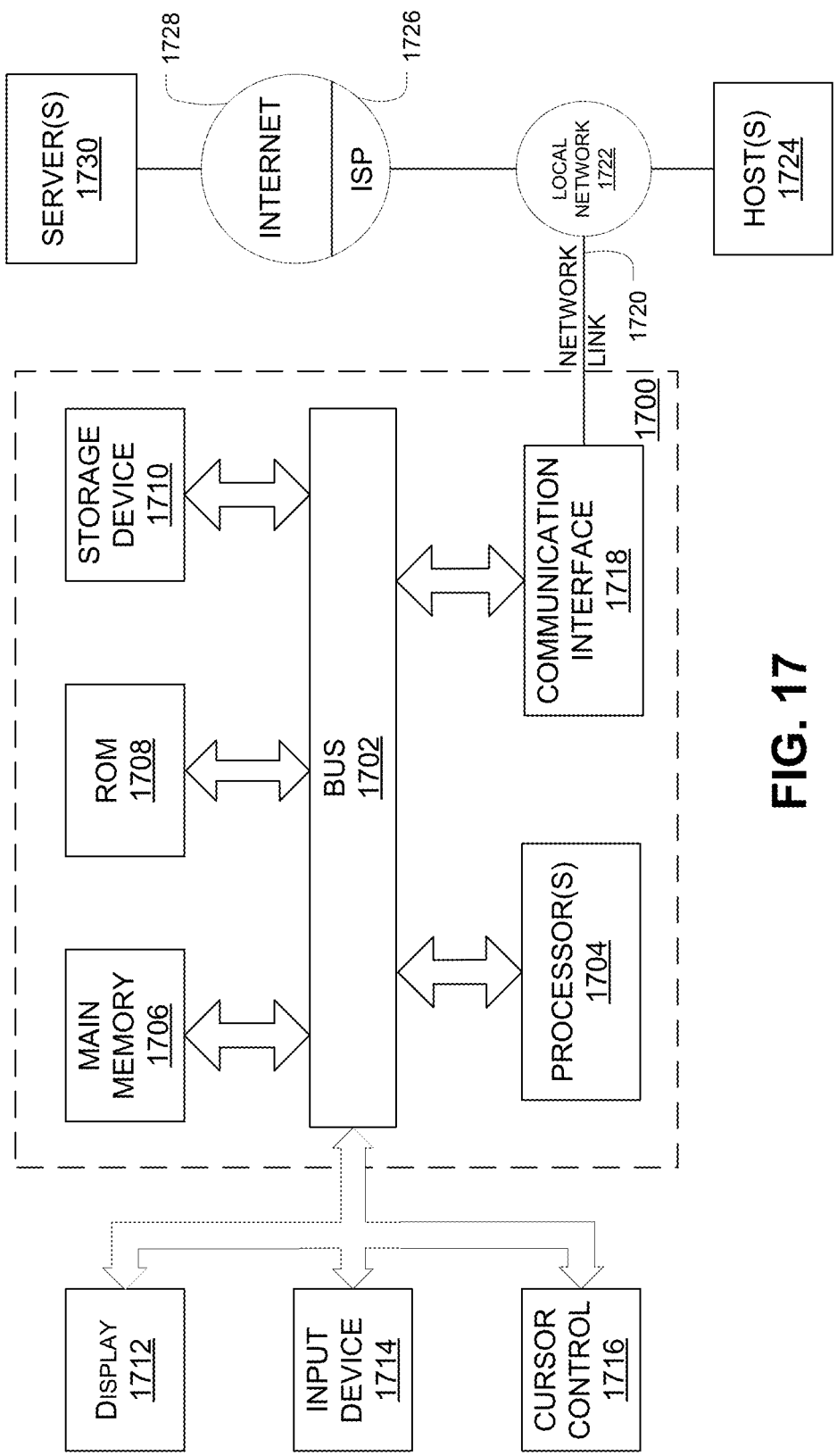
FIG. 17 illustrates a computer system with which certain methods discussed herein may be implemented, according to one embodiment.

For example, FIG. 17 is a block diagram that illustrates a computer system 900 upon which an embodiment may be implemented. For example, any of the computing devices discussed herein may include some or all of the components and/or functionality of the computer system 1700.

Computer system 1700 includes a bus 1702 or other communication mechanism for communicating information, and a hardware processor, or multiple processors, 1704 coupled with bus 1702 for processing information. Hardware processor(s) 1704 may be, for example, one or more general purpose microprocessors.

Computer system 1700 also includes a main memory 1706, such as a random access memory (RAM), cache and/or other dynamic storage devices, coupled to bus 1702 for storing information and instructions to be executed by processor 1704. Main memory 1706 also may be used for storing temporary variables or other intermediate information during execution of instructions to be executed by processor 1704. Such instructions, when stored in storage media accessible to processor 1704, render computer system 1700 into a special-purpose machine that is customized to perform the operations specified in the instructions. Main memory 1706 may also store cached data, such as zoom levels and maximum and minimum sensor values at each zoom level.

Computer system 1700 further includes a read only memory (ROM) 1708 or other static storage device coupled to bus 1702 for storing static information and instructions for processor 1704. A storage device 1710, such as a magnetic disk, optical disk, or USB thumb drive (Flash drive), etc., is provided and coupled to bus 1702 for storing information and instructions. For example, the storage device 1710 may store measurement data obtained from a plurality of sensors.

Computer system 1700 may be coupled via bus 1702 to a display 1712, such as a cathode ray tube (CRT) or LCD display (or touch screen), for displaying information to a computer user. For example, the display 1712 can be used to display any of the user interfaces described herein with respect to FIGS. 1 through 11D. An input device 1714, including alphanumeric and other keys, is coupled to bus 1702 for communicating information and command selections to processor 1704. Another type of user input device is cursor control 416, such as a mouse, a trackball, or cursor direction keys for communicating direction information and command selections to processor 1704 and for controlling cursor movement on display 1712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 1700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

Computer system 1700 may implement the techniques described herein using customized hard-wired logic, one or more ASICs or FPGAs, firmware and/or program logic which in combination with the computer system causes or programs computer system 1700 to be a special-purpose machine. According to one embodiment, the techniques herein are performed by computer system 1700 in response to processor(s) 1704 executing one or more sequences of one or more instructions contained in main memory 1706. Such instructions may be read into main memory 1706 from another storage medium, such as storage device 1710. Execution of the sequences of instructions contained in main memory 1706 causes processor(s) 1704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1710. Volatile media includes dynamic memory, such as main memory 1706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1702. Transmission media can also take the form of acoustic or light waves, such as those generated during radio-wave and infra-red data communications.

Various forms of media may be involved in carrying one or more sequences of one or more instructions to processor 1704 for execution. For example, the instructions may initially be carried on a magnetic disk or solid state drive of a remote computer. The remote computer can load the instructions into its dynamic memory and send the instructions over a telephone line using a modem. A modem local to computer system 1700 can receive the data on the telephone line and use an infra-red transmitter to convert the data to an infra-red signal. An infra-red detector can receive the data carried in the infra-red signal and appropriate circuitry can place the data on bus 1702. Bus 1702 carries the data to main memory 1706, from which processor 1704 retrieves and executes the instructions. The instructions received by main memory 1706 may retrieve and execute the instructions. The instructions received by main memory 1706 may optionally be stored on storage device 1710 either before or after execution by processor 1704.

Computer system 1700 also includes a communication interface 1718 coupled to bus 1702. Communication interface 1718 provides a two-way data communication coupling to a network link 1720 that is connected to a local network 1722. For example, communication interface 1718 may be an integrated services digital network (ISDN) card, cable modem, satellite modem, or a modem to provide a data communication connection to a corresponding type of telephone line. As another example, communication interface 1718 may be a local area network (LAN) card to provide a data communication connection to a compatible LAN (or WAN component to communicated with a WAN). Wireless links may also be implemented. In any such implementation, communication interface 1718 sends and receives electrical, electromagnetic or optical signals that carry digital data streams representing various types of information.

Network link 1720 typically provides data communication through one or more networks to other data devices. For example, network link 1720 may provide a connection through local network 1722 to a host computer 1724 or to data equipment operated by an Internet Service Provider (ISP) 1726. ISP 1726 in turn provides data communication services through the world wide packet data communication network now commonly referred to as the "Internet" 1728. Local network 1722 and Internet 1728 both use electrical, electromagnetic or optical signals that carry digital data streams. The signals through the various networks and the signals on network link 1720 and through communication interface 1718, which carry the digital data to and from computer system 1700, are example forms of transmission media.

Computer system 1700 can send messages and receive data, including program code, through the network(s), network link 1720 and communication interface 1718. In the Internet example, a server 1730 might transmit a requested code for an application program through Internet 1728, ISP 1726, local network 1722 and communication interface 1718.

The received code may be executed by processor 1704 as it is received, and/or stored in storage device 1710, or other non-volatile storage for later execution.

Terminology

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computing system comprising:
one or more computer processors;
one or more databases storing attribute data associated with one or more physical locations; and
a computer readable storage medium storing program instructions configured for execution by the one or more computer processors to cause the computing system to:
generate user interface data usable for rendering an interactive user interface on a computing device, the interactive user interface including a map corresponding to a physical region;
receive a first selection specifying an attribute category;
receive a second selection specifying at least two attributes within the selected attribute category, wherein the at least two attributes comprise a first thickness of a first geological layer and a second thickness of a second geological layer;
access the one or more databases to identify attribute values associated with the selected at least two attributes;
aggregate the identified attribute values and determine one or more associations between the aggregated attribute values and locations on the map, wherein an aggregated attribute value associated with a particular location corresponds to a sum of the first thickness and the second thickness at the particular location;
generate a heatmap corresponding to the map, based at least in part upon the aggregated attribute values and the determined one or more associations with the locations on the map; and
update the user interface data such that the interactive user interface includes the heatmap overlaying the map.

2. The computing system of claim 1, wherein the at least one attribute comprises a depth attribute or a thickness attribute of a geological layer.

3. The computing system of claim 1, wherein the computer readable storage medium further stores program instructions configured for execution by the one or more computer processors to cause the computing system to:
calculate one or more predicted attribute values, wherein the predicted attribute values are associated with locations that are not associated with the identified attribute values.

4. The computing system of claim 3, wherein calculating a predicted attribute value is based at least in part upon a distance between the location associated with the predicted attribute value and a location associated with an identified attribute value.

5. A method comprising:
by one or more computer processors executing program instructions:
generating user interface data usable for rendering the interactive user interface on a computing device, the interactive user interface including a map corresponding to a physical region;
receiving a first selection specifying an attribute category;
receiving a second selection specifying at least two attributes within the selected attribute category, wherein the at least two attributes comprise a first thickness of a first geological layer and a second thickness of a second geological layer;
accessing the one or more databases to identify attribute values associated with the selected at least two attributes, the one or more databases storing attribute data associated with one or more physical locations;
aggregating the identified attribute values and determining one or more associations between the aggregated attribute values and locations on the map, wherein an aggregated attribute value associated with a particular location corresponds to a sum of the first thickness and the second thickness at the particular location;
generating a heatmap corresponding to the map, based at least in part upon the aggregated attribute values and the determined one or more associations with the locations on the map; and
updating the user interface data such that the interactive user interface includes the heatmap overlaying the map.

6. The method of claim 5, wherein the at least one attribute comprises a depth attribute or a thickness attribute of a geological layer.

7. The method of claim 5 further comprising:
by the one or more computer processors executing program instructions:
calculating one or more predicted attribute values, wherein the predicted attribute values are associated with locations that are not associated with the identified attribute values.

8. The method of claim 7, wherein calculating a predicted attribute value is based at least in part upon a distance between the location associated with the predicted attribute value and a location associated with an identified attribute value.

9. The computing system of claim 1, wherein the computer readable storage medium further stores program instructions configured for execution by the one or more computer processors to cause the computing system to:
determine restrictions on selection of the at least two attributes by a user based at least in part on the attribute category.

10. The method of claim 5 further comprising:
by the one or more computer processors executing program instructions:
determining restrictions on selection of the at least two attributes by a user based at least in part on the attribute category.

* * * * *